US010833863B2

(12) United States Patent
Brickell et al.

(10) Patent No.: US 10,833,863 B2
(45) Date of Patent: Nov. 10, 2020

(54) DEVICE PROVISIONING SERVICE

(71) Applicant: Intel Corporation, Santa Clara, CA (US)

(72) Inventors: Ernie F. Brickell, Portland, OR (US); Geoffrey H. Cooper, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 15/201,129

(22) Filed: Jul. 1, 2016

(65) Prior Publication Data
US 2017/0250814 A1 Aug. 31, 2017

Related U.S. Application Data

(60) Provisional application No. 62/301,340, filed on Feb. 29, 2016.

(51) Int. Cl.
| | | |
|---|---|---|
| *H04L 9/32* | (2006.01) | |
| *H04W 12/04* | (2009.01) | |
| *H04W 12/00* | (2009.01) | |
| *H04L 9/08* | (2006.01) | |
| *H04W 12/08* | (2009.01) | |

(52) U.S. Cl.
CPC .......... *H04L 9/3234* (2013.01); *H04L 9/0833* (2013.01); *H04L 9/3247* (2013.01); *H04W 12/0027* (2019.01); *H04W 12/04031* (2019.01); *H04W 12/08* (2013.01)

(58) Field of Classification Search
CPC ... H04L 9/3234; H04L 9/0833; H04L 9/3247; H04W 12/04031; H04W 12/0027; H04W 12/08
See application file for complete search history.

(56) References Cited

U.S. PATENT DOCUMENTS

| | | | | |
|---|---|---|---|---|
| 2008/0010450 A1* | 1/2008 | Holtzman | ............. | H04L 9/3228 713/157 |
| 2011/0145598 A1* | 6/2011 | Smith | ................... | G06F 21/554 713/190 |
| 2013/0007877 A1 | 1/2013 | Little et al. | | |

(Continued)

FOREIGN PATENT DOCUMENTS

WO 2017151251 9/2017

OTHER PUBLICATIONS

"International Application Serial No. PCT/US2017/015287, International Search Report dated May 23, 2017", 3 pgs.

(Continued)

*Primary Examiner* — Matthew T Henning
(74) *Attorney, Agent, or Firm* — Schwegman Lundberg & Woessner, P.A.

(57) ABSTRACT

A computing device is provisioned to be remotely managed by a current owner. The device has an initial cryptographic basis of trust, and an owner identifier that facilitates establishment of communication with the current owner of the device. The ownership may change one or more times while the device may remain inoperative. Later, the device receives a transfer-of-ownership indication, which it verifies against the initial basis of trust to establish a new current owner. The device may then communicate with a device management service of the new current owner based on the transfer-of-ownership indication.

19 Claims, 17 Drawing Sheets

(56) References Cited

U.S. PATENT DOCUMENTS

| | | | | |
|---|---|---|---|---|
| 2013/0212637 | A1* | 8/2013 | Guccione | H04L 63/102 |
| | | | | 726/1 |
| 2015/0134954 | A1 | 5/2015 | Walley et al. | |
| 2015/0222621 | A1 | 8/2015 | Baum et al. | |
| 2015/0332395 | A1* | 11/2015 | Walker | G06Q 20/065 |
| | | | | 705/69 |
| 2016/0098723 | A1* | 4/2016 | Feeney | G06Q 20/4016 |
| | | | | 705/75 |
| 2016/0241548 | A1* | 8/2016 | Kim | G06F 21/74 |
| 2016/0292680 | A1* | 10/2016 | Wilson, Jr. | G06Q 20/02 |
| 2016/0300234 | A1* | 10/2016 | Moss-Pultz | G06Q 20/3827 |
| 2016/0364787 | A1* | 12/2016 | Walker | H04L 9/0891 |
| 2017/0046664 | A1* | 2/2017 | Haldenby | G06Q 20/0655 |
| 2017/0366347 | A1* | 12/2017 | Smith | H04L 9/3221 |
| 2018/0270064 | A1* | 9/2018 | Gehrmann | H04W 4/70 |

OTHER PUBLICATIONS

"International Application Serial No. PCT/US2017/015287, Written Opinion dated May 23, 2017", 6 pgs.

Ned, Smith, "The Open Interconnect Consortium(OIC) Security Model and Vision", In: Embedded Linux Conference, [Online] Retrieved from the internet:http://elinux.org/images/2/24/The_Open_Interconnect_Consortium_%28OIC%29_Se curity_Model_and_Vision.pdf, (Mar. 22, 2015), 1-18.

Oscar, Garcia-Morchon, "Security Considerations in the IP-based Internet of Things", [Online] Retrieved from ihe internet:https://tools.ietf.org/pdf/draft-garcia-core-security-06.pdf, (Sep. 11, 2013).

* cited by examiner

DEVICE PROVISIONING SERVICE

CLAIM TO PRIORITY

This Application claims the benefit of U.S. Provisional Application No. 62/301,340, filed Feb. 29, 2015, the disclosure of which is incorporated by reference herein.

TECHNICAL FIELD

Embodiments described herein generally relate to information processing and security, more particularly, to securely managing ownership or, more generally, dominion privileges for manufactured information devices as the devices change hands in a product distribution chain or from an end-user to a subsequent new end-user entity.

BACKGROUND

Today, when a customer installs a new computing device, such as an Internet of Things (IoT) device, in their home or business, there is considerable effort to configure the device so that the customer may exercise ownership of the device. For instance, in the case of a network-connected device, an essential group of configuration settings may need to be programmed so that the device may find its owner's network, and achieve secure connectivity. Conventionally, the user or administrator of the device would conduct a configuration process using a suitable user interface.

This configuration process may be quite burdensome, particularly for layperson users. Moreover, IoT devices tend to have very limited (or sometimes non-existent) user interfaces, further complicating the setup process. Even in the case of sophisticated users, such as businesses with information technology (IT) professionals, the scale of deployment of devices, which may number in the hundreds, thousands, tens of thousands, etc., presents practical challenges if per-unit setup procedures are called for. Moreover, there may be further challenges presented when devices are to be transferred to a new owner, e.g., in the case of an after-market sale, or an inter-department transfer within an organization, etc., when devices may not be in a factory-reset condition and may contain sensitive information belonging to a prior owner. A practical solution is needed to address these, and other, challenges.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
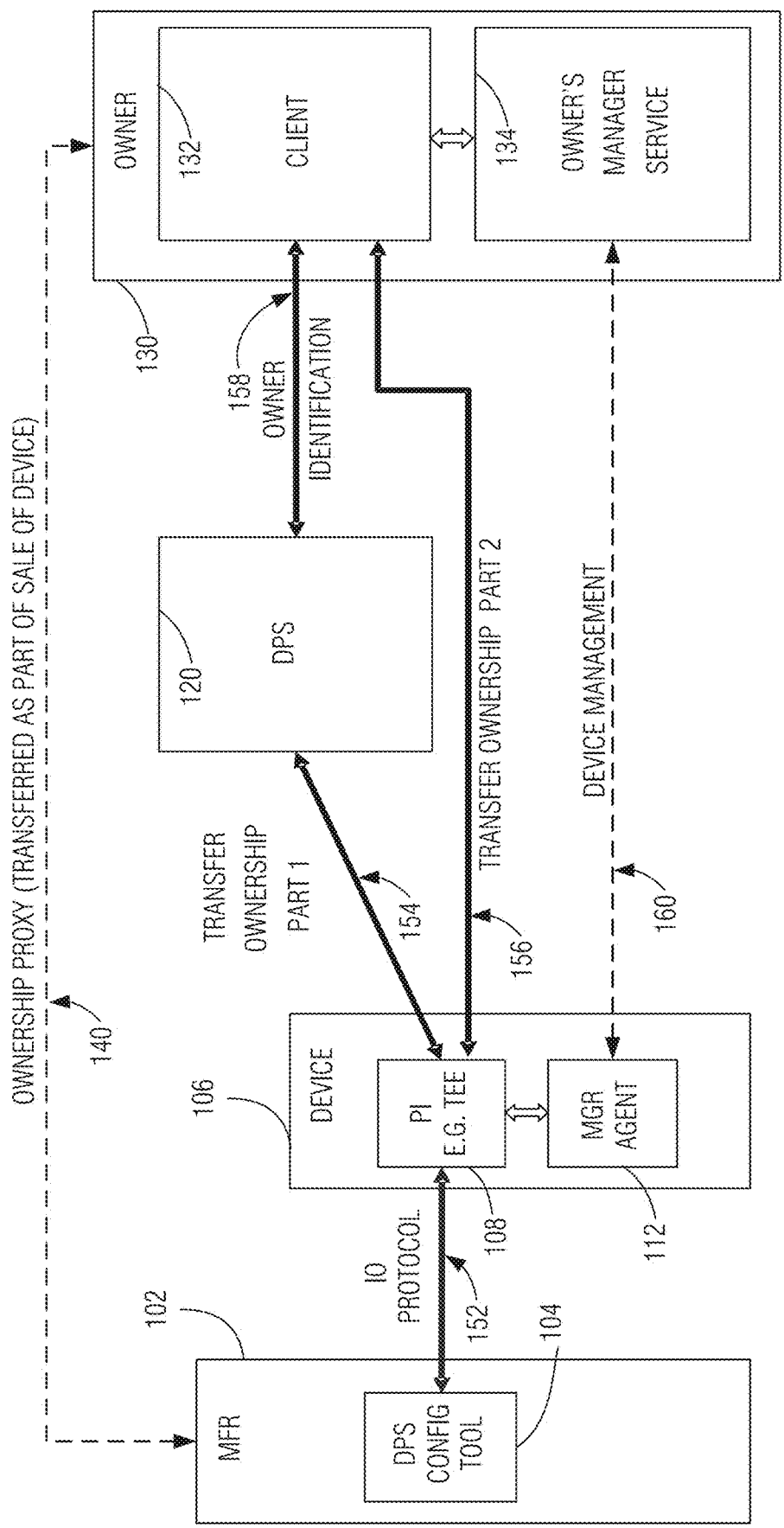
FIG. 1 is a diagram illustrating various entities that participate in the device provisioning service (DPS) protocol according to some embodiments.

Aspects of the embodiments are directed to a device provisioning service (DPS). In the present context, device provisioning is a process for configuring secret(s) or network address(es), or executing commands, in a device so that the device and its network-based manager are able to connect in a trusted connection. For example, they may share a secret or have trusted public key infrastructure (PKI) credentials. Also, device commands may be provisioned, such as, for example, the name of a program to execute in order to connect to the target management server.

In some embodiments, when a device is manufactured, is integrated into a greater system by the system OEM, configured at a distributor, wholesaler, or retailer, or elsewhere in the manufacturing/supply/distribution chain, it is given a device global unique identification (GUID), and a URL of a DPS. At the time of purchase of a new device, the customer is provided with a credential that can be used to take ownership or, more generally, exercise dominion, of the device, the device GUID, and the URL of a DPS. The DPS is used to connect the device with the customer. Any suitable cryptographic protocols may be used to do this securely and to meet privacy requirements.

Although ownership of the device and the exercise of dominion over the device are similar but distinct concepts, in the present context, ownership and the exercise of dominion are used interchangeably for the sake of brevity and clarity. Accordingly, an entity that rightfully exercises dominion over a device (for example, as a third party acting on behalf of the device's owner) may not technically be the owner of the device, the following discussion may refer to the dominion-exercising entity as the owner, insofar as the entity is acting like the owner for practical purposes.

In the described embodiments, the device initiates a connection to the manager. This may offer certain advantages in that: (a) the IP address of the manager may be less likely to change than the IP address of the device, or (b) the traffic outbound through network firewalls may be more permissive than the reverse, increasing the likelihood that the device to manager connection will not need special firewall policy. However, it will be understood that principles of the embodiments, with other advantages, may be realized when the manager initiates the connection to the device. Accordingly, the latter option is contemplated as another type of embodiment and is not to be excluded.

According to some embodiments, a device is configured for remote dominion during manufacturing with:

A processor configured with a provisioning interface (PI), such as a trusted execution environment (TEE), with cryptographic hardware root of trust. The provisioning interface may be based on enhanced privacy identification (EPID), or public key cryptography. The provisioning interface may include a DPS application that maintains, and performs operations, on device credentials;

A device ownership credential, accessible only within the provisioning interface;

A device manufacturer description, including a device description, accessible only within the provisioning interface;

A set of rendezvous information that indicates a DPS service on a network such as the Internet, to use to find the device's owner.

As utilized in some embodiments, EPID is a digital signature scheme having special properties, in which there is one group public key that corresponds to multiple private keys. Each unique private key may be used to generate a signature, and that signature may be verified using the group public key. Other embodiments may use other digital signature schemes (e.g., public key cryptography such as RSA, elliptic curve cryptography, etc.).

According to some embodiments, DPS-enabled devices are provisioned by communicating with a DPS server on the Internet. In related embodiments, the DPS-enabled device connects via a special proxy device to the Internet-based DPS server even if the device is never subsequently connected to the Internet. In other related embodiments, an enterprise server within a business, or some other organization, hosts the DPS on a LAN or other enterprise network. A DPS-enabled device may be provisioned by connecting with such an enterprise-hosted DPS. This may be accomplished, for example, by the enterprise server intercepting communications addressed to an Internet protocol address outside of the organization, and handling the DPS exchange locally, e.g., within the enterprise network.

In another embodiment, a DPS may be configured on a non-networked machine or peripheral. For example, a DPS may be implemented as a stand-alone device that connects to the DPS-enabled device by a wired (e.g., USB) or wireless (e.g., personal-area network such as Bluetooth).

Between when the device is manufactured and when it is first powered on and given access to the Internet, the device may transfer ownership multiple times. According to an embodiment, a structured digital document, called an ownership proxy, is used to transfer digital ownership credentials from a previous owner to a subsequent owner, without the need to power on the device.

In some embodiments, when the device is first powered, preconfigured DPS protocols are invoked, causing the device to access the DPS. By protocol cooperation between the device, the DPS, and the new owner, the device and the new owner are able to prove themselves to each other, sufficiently to allow the new owner to establish new cryptographic control of the device. When this process is finished, the device is equipped with:

The Internet address and public key of its manager;

Optionally, a random number upon which a shared secret may be based;

Optionally, a key pair whose public key is in a certificate signed by a trusted party of its manager;

Optionally, in an embodiment utilizing EPID, an additional EPID key from a group chosen by the new owner;

Optionally, a set of programs names to run and key-value pairs to pass to these programs.

In an example embodiment, a 2-way authenticated Transport Layer Security (TLS) connection is established from the device to the manager. In a related embodiment, where other credentials are needed, a TLS connection with the provisioned credentials permits the manager to provide different credentials.

In some embodiments, DPS preserves the privacy of a device's progress from manufacturing to ownership, to resale or decommissioning. A number of protocol features are provided in various embodiments that help to make this possible. For instance, the public keys exposed by protocol entities may be created only for the purposes of DPS, and may be used temporarily, with new keys generated frequently to keep them from being used as a profile traceable to a manufacturer, a device, or a device owner/operator.

In another example, the Transfer Ownership protocol may replace all keys and identifiers in the device, except the EPID key, so that no record of previous ownership chain exists. It may not be necessary to replace the EPID key for a privacy concern.

In an embodiment, EPID may be used to prove the ability to take ownership without identifying the device to the DPS server or to anyone monitoring Internet traffic at the DPS server, EPID may also be used to prove manufacturer and model number without identifying the device.

FIG. 1 is a diagram illustrating various entities that participate in the DPS protocol according to some embodiments. As will be described in greater detail below, the DPS protocol may include initial ownership (IO) protocol 152, transfer ownership—part 1 154, transfer ownership—part 2 156, and owner identification 158. Also depicted are examples of an ownership-proxy transfer 140, and device management communications 160. The ownership proxy transferred at 140 is described in greater detail below. In general, it is a digitally-signed document that serves as a record of transaction that may be used by the new owner to take control of the device when it is powered on. Device management communications at 160 represents a type of control of device 106 that may be exercised by its current owner 130 once the ownership rights have been established for the entities.

Each of the entities in this example includes a processor-based computing platform. The example DPS protocols described below operate to pass messages between cooperating entities.

Manufacturer (MFR) 102. The manufacturer 102 is a computing platform running a DPS configuration tool 104 at the factory that produces the device. The MFR 102 implements the initial communications with the Device's provisioning interface (PI) 108, as part of the Initial Ownership (IO) protocol 152.

Device 106. Device 106 has hardware and software provisioned on it, including a provisioning interface (PI) 108 and a manager agent 112.

Provisioning interface (PI) 108 is constructed, programmed, or otherwise configured, to facilitate communication between device 106, and DPS 120, as well as client 132 of owner 130 to carry out transfer-of-ownership protocols 154 and 156, respectively. PI 108 may be implemented using a trusted execution environment provided within the device 106 according to some embodiments. In other embodiments, where security needs are less stringent, for example, the TEE may be omitted. In embodiments utilizing a TEE-based PI 108, the TEE may be implemented as a co-processor or special processor mode that executes a kernel of code to run, with credentials to prove its authenticity. Device 106 may implement a Dynamic Application Loader (DAL) to allow new (signed) applications to be added to the co-processor.

Manager agent 112 is constructed, programmed, or otherwise configured, to connect the device 106 to its manager 134 across the network. The establishment of the connection follows an example DPS protocol 160 described below. Once connected, the other functionality of this module is specific to the Manager 134, which may vary widely across various implementations.

Owner 130 is an entity that has an ownership credential that allows the entity privileges on the Device PI 106, including the privilege to manage the ownership credentials of others. Aside from the manufacturer 102, there may also have been an arbitrary number of previous owners, who bought and sold the device while it was still "boxed." The owner 130 uses the client 132 to provision new devices, and then controls the devices across a network using manager 134.

Client 132 is an entity constructed, programmed, or otherwise configured, to carry out DPS protocols 158 for owner identification, and 156 for transfer of ownership on behalf of the owner 130. In some embodiments, the client 132 operates on a computing platform controlled by the owner 130. After the DPS protocols are completed, the client 132 may transfer control of the device to the manager 134, and no longer interact with the device 106.

Manager 134: is constructed, programmed, or otherwise configured, to manage devices (such as device 106) across a network. Embodiments may range from an application on a user's computer, phone or tablet, to an enterprise server, to a cloud service spanning multiple geographic regions. Manager 134 interacts with manager agent 112 of the device 106. In some embodiments, the manager 134 is a separate management or cloud management service that is provisioned using DPS.

In a related embodiment, manager 134 is implemented as a cloud service to which owner 130 may delegate certain ownership rights, where the manager 134 may exercise the ownership credentials of the owner 130.

DPS 120: is a service hosted on a network (e.g., Internet, enterprise, etc.) or as a stand-alone device, that operates as a rendezvous point between a device 106 and the client 132 of owner 130, including in particular when device 106 is initially operated "out of the box."

Note the distinction between the device PI 108 and the manager agent 112; and between the client 132 and the owner's manager service 134 according to some embodiments:

The PI 108 performs the DPS protocols and manipulates and stores DPS credentials. The device PI may store other credentials and perform other services (e.g., cryptographic services) for the device, such as root of trust related services.

The device 106 itself runs its basic functions in user mode. Among these, is the manager agent 112, a user-mode service process that connects it to its owner's manager 112.

Client 132 is an engine that is dedicated specifically to running the DPS Protocol on behalf of the owner's manager service 134. For example, this code may have its own IP addresses, so that the eventual owner's manager service IP addresses (which may be well known) are hidden from prying eyes.

The owner's manager service 134 may be an Internet-resident service that provides management services for the owner 130 on an ongoing basis.

Figure 2:
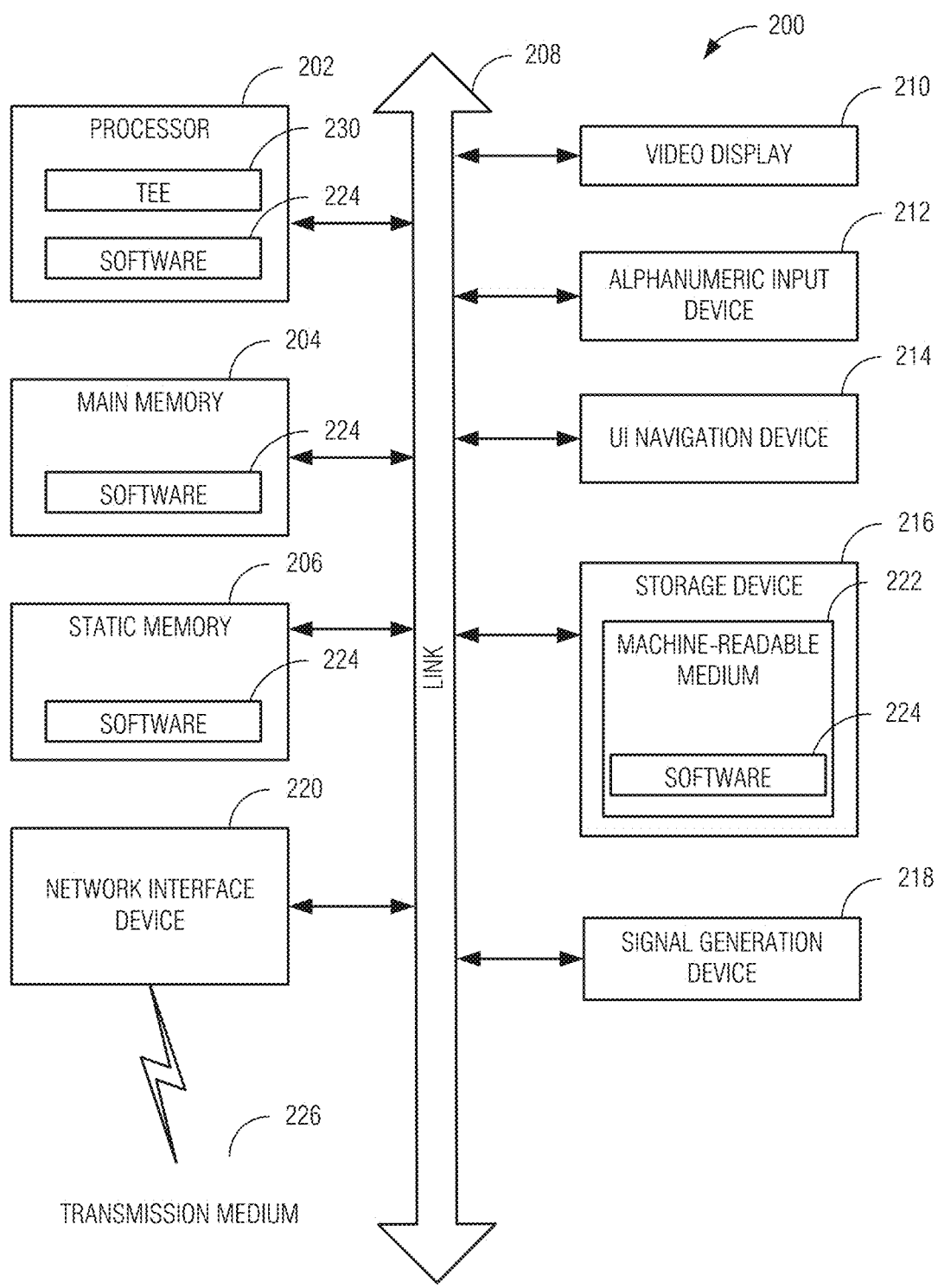
FIG. 2 is a block diagram illustrating an exemplary system architecture of a processor-based computing device according to an embodiment.

FIG. 2 is a block diagram illustrating a computer system in the example form of a general-purpose machine that may be configured with one or more modules to operate as a special-purpose machine. In a networked deployment, the computer system may operate in the capacity of either a server or a client machine in server-client network environments, or it may act as a peer machine in peer-to-peer (or distributed) network environments.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

System 200 may also include a trusted execution environment (TEE) 230 which, as depicted, may be formed or configured as part of processor 202. The TEE 230 will be described in greater detail below.

Figure 3:
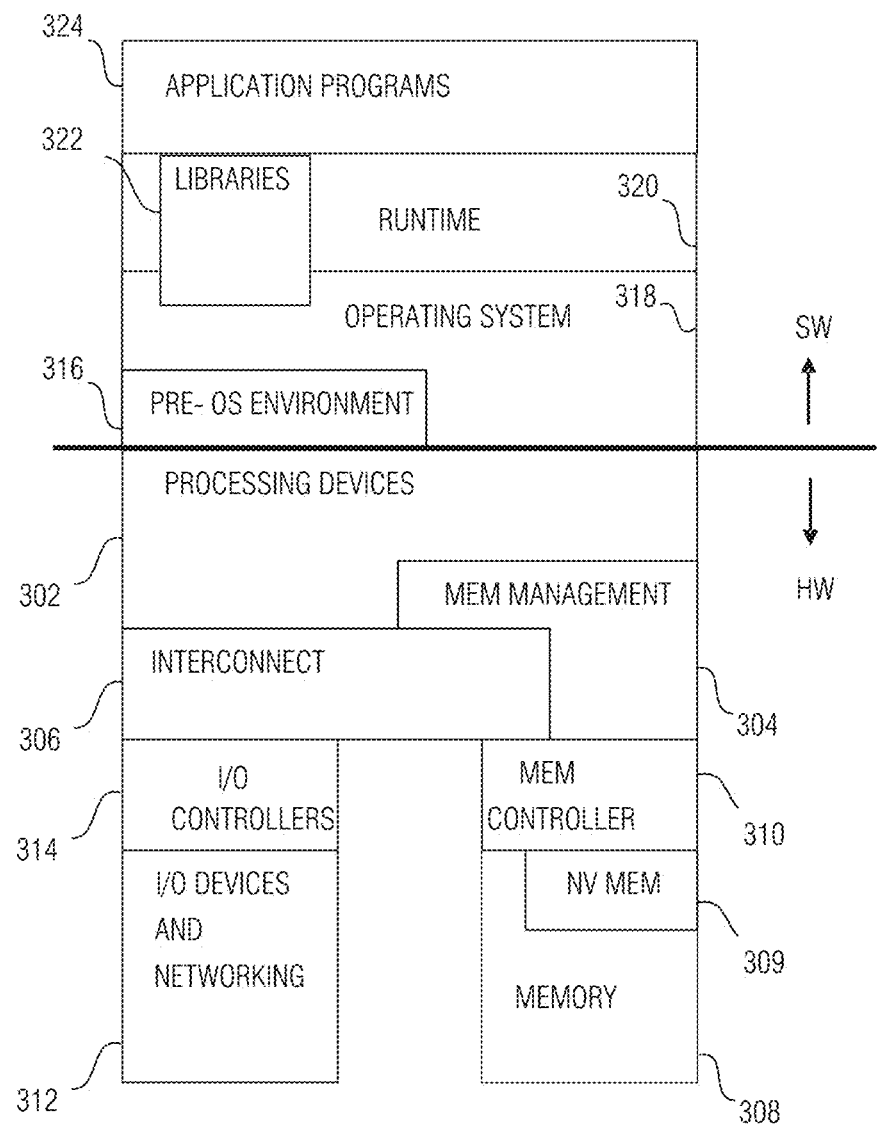
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
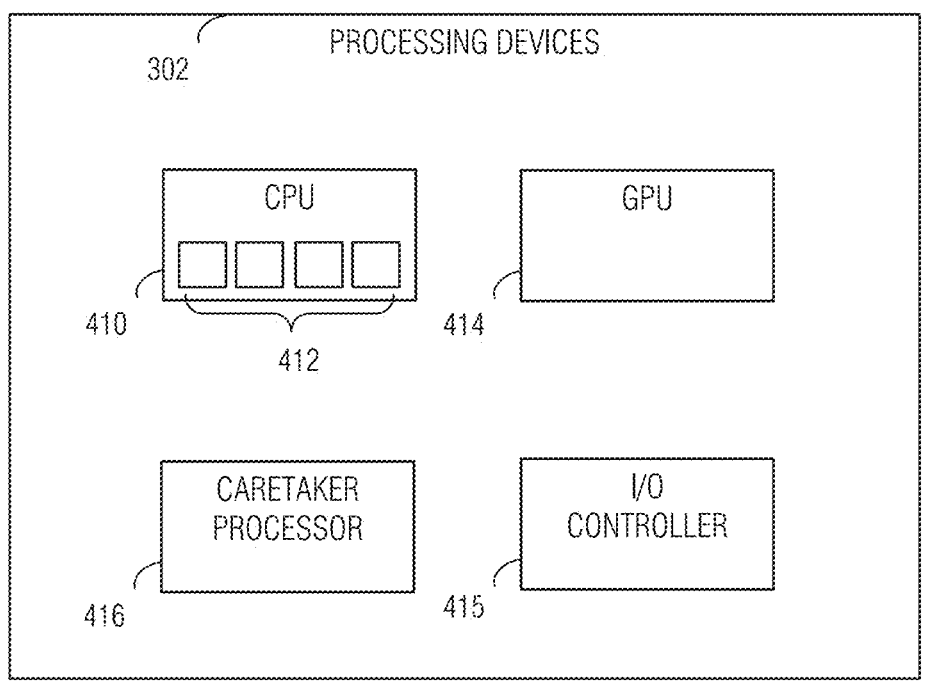
FIG. 4 is a block diagram illustrating examples of processing devices that may be implemented on a computer system, such as the computer system described with reference to FIGS. 2-3, according to some embodiments.

FIG. 4 is a block diagram illustrating processing devices 302 according to some embodiments. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be a x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in some embodiments. Caretaker processor 416 generally does not participate in the processing work to carry out software code as CPU 410 and GPU 414 do. In some embodiments, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computer system. In some embodiments, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

In one embodiment, two or more of processing devices 302 depicted are formed on a common semiconductor substrate.

Figure 5:
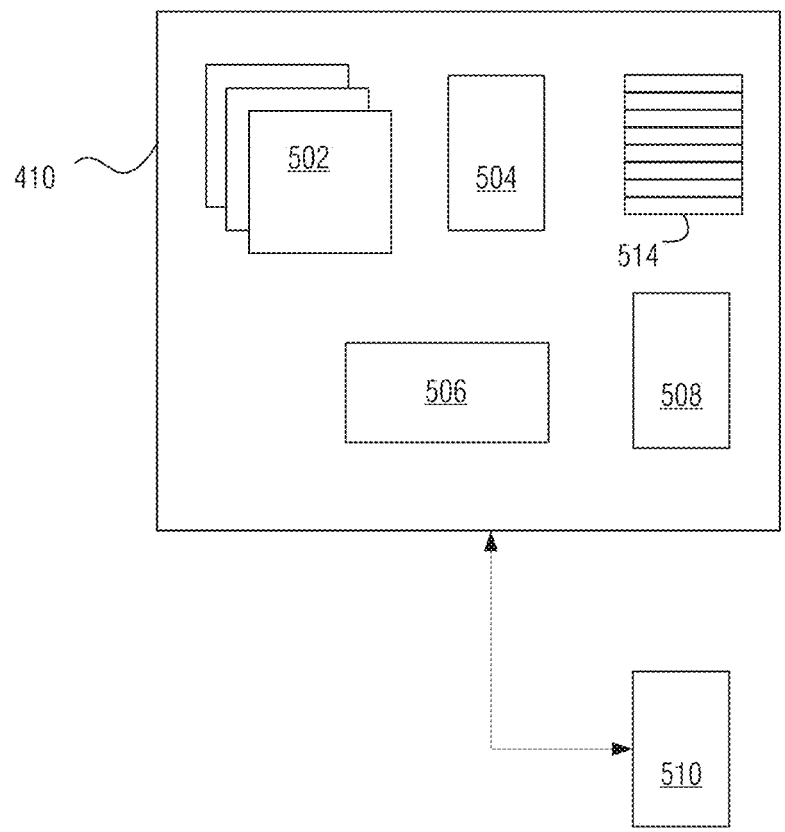
FIG. 5 is a block diagram illustrating example components of a CPU as one of the processing devices depicted in FIG. 4, according to various embodiments.

FIG. 5 is a block diagram illustrating example components of CPU 410 according to various embodiments. As depicted, CPU 410 includes one or more cores 502, cache 504, and CPU controller 506, which coordinates interoperation and tasking of the core(s) 502, as well as providing an interface to facilitate data flow between the various internal components of CPU 410, and with external components such as a memory bus or system interconnect. In one embodiment, all of the example components of CPU 410 are formed on a common semiconductor substrate.

CPU 410 includes non-volatile memory 508 (e.g., flash, EEPROM, etc.) for storing certain portions of foundational code, such as initialization code, and code that sets us a trusted execution environment (TEE). Also, CPU 410 may be interfaced with an external (e.g., formed on a separate IC) non-volatile memory device 510 that stores foundational code that is launched by the initialization module, such as system BIOS or UEFI code. Notably, some of the non-volatile memory may be accessible only to the TEE, and is therefore secured from malicious processes in the event that the system is compromised.

In the embodiment depicted, CPU 410 is configured to provide a trusted Execution Environment (TEE). Trusted applications or other code running in a TEE have access to the full power of a device's main processor and memory, while hardware isolation protects these from user installed apps running in a main operating system. Software and cryptographic isolation inside the TEE protect the trusted applications contained within from each other.

Examples, as described herein, may include, or may operate on, logic or a number of components, circuits, engines, or modules, which for the sake of consistency are termed engines, although it will be understood that these terms may be used interchangeably. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor core configured using software; the general-purpose hardware processor core may be configured as respective different modules at different times. Software may accordingly configure a hardware processor core, for example, to constitute a particular module at one instance of time and to constitute a different module at a different instance of time.

Figure 6:
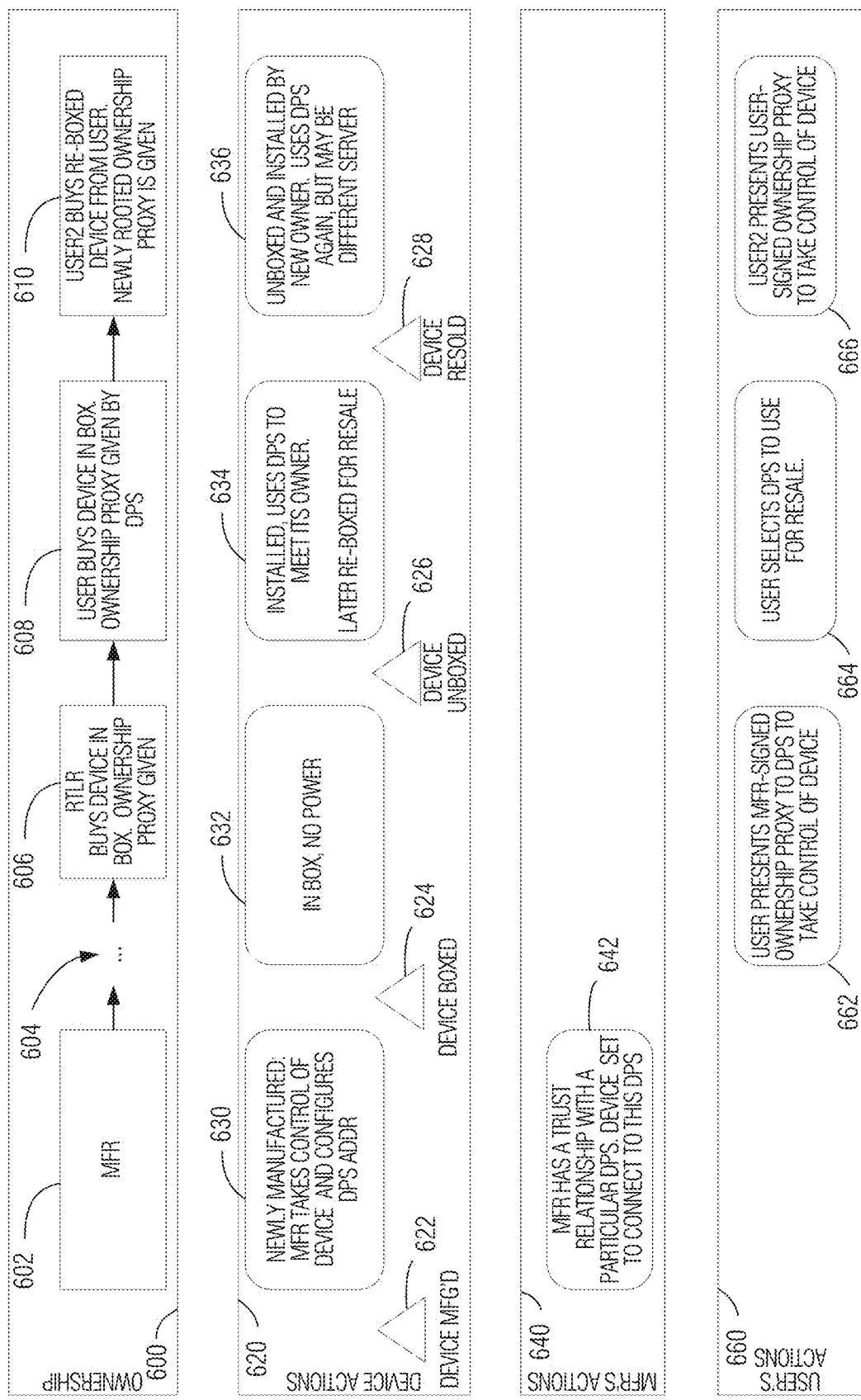
FIG. 6 is a high-level diagram illustrating an overview of a DPS process according to some embodiments.

FIG. 6 is a high-level diagram illustrating an overview of a DPS process according to some embodiments. Example ownership sequence 600 progresses from the manufacturer MFR at 602 to distributors, wholesalers, or one or more other intermediaries, indicated generally at 604, to Retailer RTLR at 606 to owner/user USER at 608. The device may transition ownership one or more times while it is still in a box meaning that the device may remain non-operational while having ownership transition from one entity to another. Eventually, User buys, installs and takes control of the device. Later, the owner may sell the device to another owner (User2) at 610.

Device actions sequence 620 illustrates various product lifecycle stages and device states and actions relating to ownership of the device. As depicted, the lifecycle stages include device manufacture 622, in-box 324, out-of-box (e.g., powered on) 626, and reselling of the device 628. When the device is first manufactured at 622, the manufacturer MFR communicates with the device's provisioning interface PI (e.g., TEE) at 630 to take control of the device. The manufacturer contracts with a DPS, and stores information about the DPS, such as its address server in the PI.

While the device may still be in the box at 632, ownership authority may be extended using an ownership proxy. When the device is powered on at 634, it accesses the configured DPS server. The DPS server operates as a rendezvous point for the device to meet its owner. At this time, or sometime before the next transfer of ownership, the current owner may configure the device to use a new DPS. Later, when the device is re-sold at 628, the device may contact the configured DPS at 636 (which may be a different DPS if so reconfigured) to obtain information about the new owner. The ownership proxy enables the new owner to exercise dominion of the device without any ongoing participation of previous owners.

Manufacturer's actions 640 include configuring the device initially with a particular DPS at 642 so that the device can find its new owner, which may be specified later.

Users actions 660 include presenting the manufacturer-signed ownership proxy to the DPS at 662 to demonstrate authorization to take control of the device, and selecting the same or a different DPS for subsequent transfer of ownership at 664. The new user, USER2, may present the ownership proxy to the specified DPS at 666 to demonstrate authorization to take control of the device.

The following protocols are defined as part of the DPS protocol. Each protocol is identified with an abbreviation, suitable use as a programming prefixes.

Initial Ownership Protocol, (IO)
New Owner Identify Protocol (NO)
Transfer Ownership Protocol Part 1 (TO1)
Transfer Ownership Protocol Part 2 (TO2)

Figure 7:
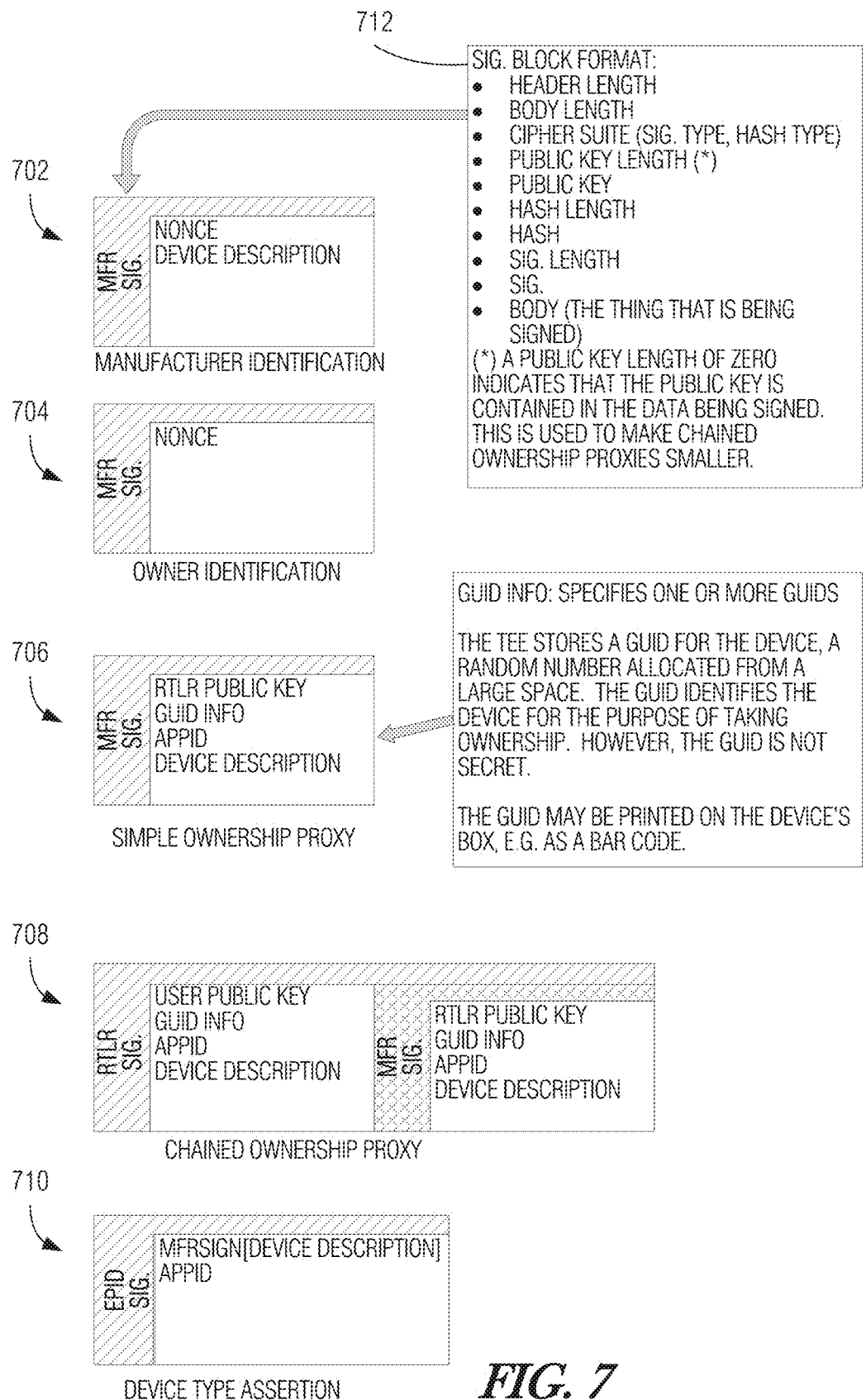
FIG. 7 is a diagram illustrating various data structures that are interchanged between DPS-participating entities according to various embodiments.

Some of the interactions between entities may not be specifically defined in the DPS protocol. Examples of such interactions include the manufacturer creating an ownership proxy based on the credentials in the Initial Ownership (IO) protocol. The ownership proxy is a digital document that provides the owner with the credentials to take ownership of the device. It is extended with each owner while the device is offline (e.g., boxed, shipping) between the manufacturer and owner. In some embodiments, DPS may not specify how the ownership proxy is transported from the manufacturer to the owner DPS Client, where it is used in the DPS protocols, FIG. 7 is a diagram illustrating various data structures that are used as ownership proxies that may be interchanged between DPS-participating entities according to various embodiments. Manufacturer identification ownership proxy data structure 702 includes a nonce, and a description of the device, as indicated. The payload is digitally signed by the manufacturer's signature, which may include a number of different fields, as indicated at 712, for example. In a related embodiment, a trusted execution environment (TEE) in the device stores the MFR signature permanently to securely indicate that this is a MFR-originated device of a specific model.

In a related embodiment, as illustrated at 704, the device also stores an ownership credential, which in this example is representative of MFR as the initial ownership assignment. Later, in response to transfers of ownership, the ownership credential may be updated to represent a future owner of the device.

Data structure 706 is a simple ownership proxy according to an embodiment. In this example, In the simple ownership proxy, the ownership signature is stored in the TEE. In a simple example, the ownership proxy allows one owner to give a "take ownership" capability to a new owner. For example, in a typical distribution chain, the MFR may grant this right to RTLR.

Data structure 708 represents a chained ownership proxy, in which the ownership proxy represents a chain of title, where one owner signs the proxy over to another, similar to endorsing a check. In one example, as depicted, MFR's proxy to RTLR can be proxied over to User. Note that the device may still be in the box while this takes place. The chaining, or cascading, of ownership proxy permits the in-box device (which is non-operational at that time) to trust the new owner when initial operation is established.

In a related embodiment, as depicted at 710, a device description is stored in the device by the manufacturer (MFR). This data structure contains a description of the device, such as a model number. When signed with EPID, a device description may be used to assert the device type without revealing other details of the device. This may be applicable in networking arrangements to enable the device to enter the network or access the Internet.

FIGS. 8-15B are flow diagrams illustrating operations performed by the various DPS-participating entities, such as the manufacturer, device, DPS, and owner(s), as they carry out DPS-related protocols according to various embodiments. It is important to note that the processes are richly-featured embodiments that may be realized as described; in addition, portions of the processes may be implemented while others are excluded in various embodiments. The following Additional Notes and Examples section details various combinations, without limitation, that are contemplated. It should also be noted that in various embodiments, certain process operations may be performed in a different ordering than depicted in FIGS. 8-15B, provided that the logical flow and integrity of the process is not disrupted in substance.

Figure 8:
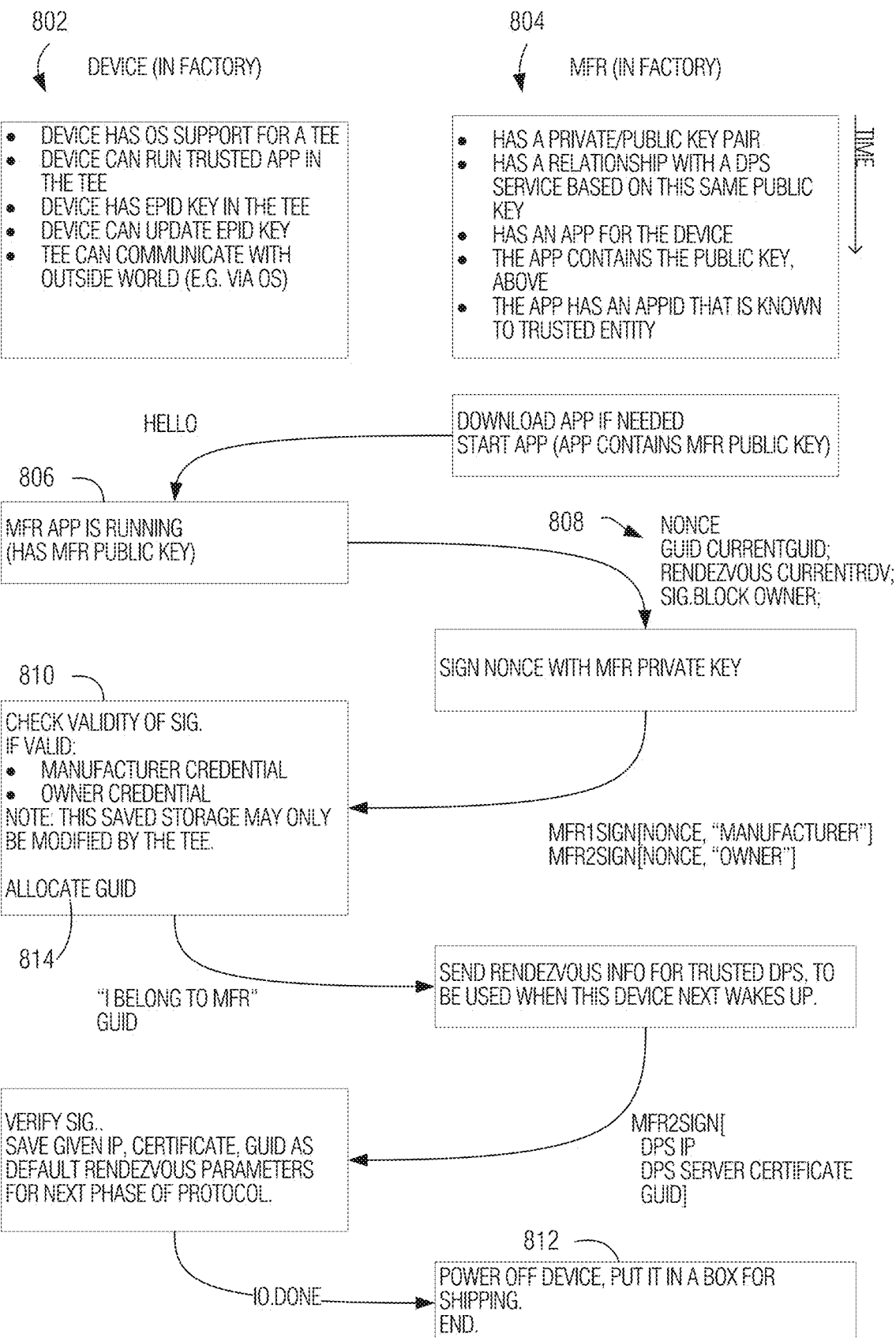
FIG. 8 is a process flow diagram illustrating an Initial Ownership (IO) protocol according to some embodiments.

FIG. 8 is a process flow diagram illustrating an Initial Ownership (IO) protocol according to some embodiments. The entities involved in this example process are the device 802 (particularly, the TEE of the device in this example) and the manufacturer MFR 804, while the device is being fabricated. One function of this protocol is to embed ownership and manufacturing credentials into the device TEE and to prepare for creating an ownership proxy with which to transfer ownership of the device.

As indicated, the device 802 according to this example has OS support for a TEE; the device can run a trusted application in the TEE; it has an EPID key in the TEE; the device can update its EPID key; and the TEE can communicate with the outside world. Manufacturer MFR 804 has a private/public key pair; it has an established trust relationship with a DPS service based on this same public key; it has an application for the device; the application contains the public key; and the application has an AppID that is known to a trusted entity.

In the factory, MFR 804 takes control of the device 802. The MFR 804 ownership stays in the device while the device 802 is boxed. However, the device 802 can be sold multiple times while it remains in the box. MFR 804 has provisioned the device with access to a DPS server that it can use to find its new owner. This allows MFR 804 to sell the device 802 while it is still in the box, without needing to explicitly tell the device 802 about its new owner. In one embodiment, the device 802 has a TEE that is implemented as part of the CPU.

The IO protocol according to the embodiment depicted starts with:

Device 802 and DPS factory application attached to a local network within the factory;

The DPS Factory Application has access to:

Public key for device ownership, which will be used to validate an ownership proxy;

Public key for device manufacturer, which will be published as a certificate;

Device description, configured by manufacturer;

Device TEE running known DPS application at 806.

The IO protocol according to the embodiment depicted includes:

The DPS Factory Application has information and credentials to create an ownership proxy for the device 802 (or has the ownership proxy itself) at 808;

The device 802 has ownership and manufacturer credentials stored in its TEE at 810;

The device 802 is ready to be powered off and boxed for shipment at 812. No further network attachment is necessary.

The device 802 has a GUID that may be used to identify it to its new owner at 814. This GUID is also known to the DPS Factory Application. The GUID is not a secret. Specifically, the GUID is intended to be visible to the owner when the device 802 is shipped in a box, e.g., being on the box itself with a bar code, or being on the bill of lading, for example. The GUID is used for one DPS transfer of ownership only; after the Transfer Ownership Protocol, the GUID is replaced, and the Device has no memory of the original GUID.

Figure 9:
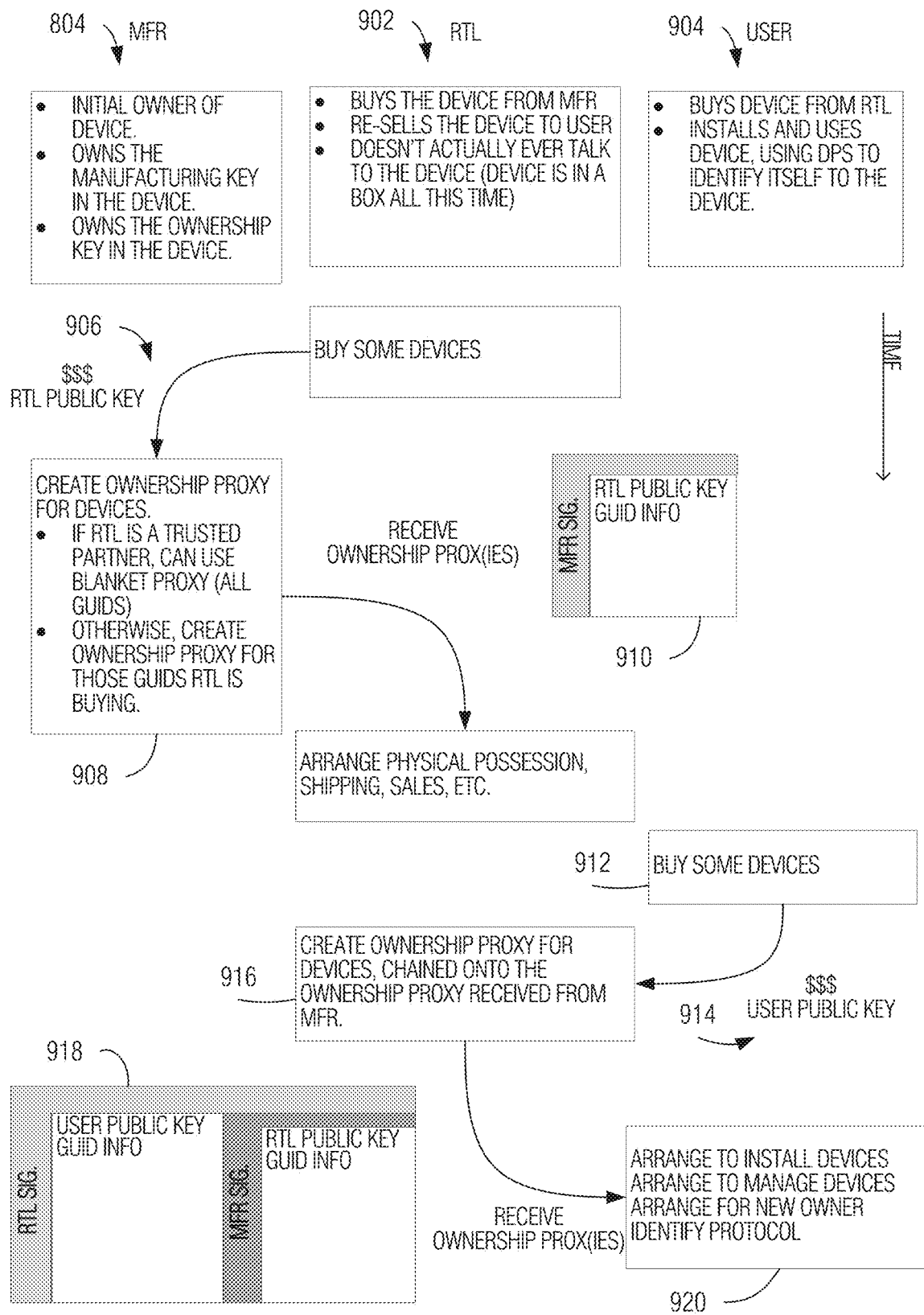
FIG. 9 is a flow diagram illustrating an example process in which offline sales are supported by the DPS protocol according to some embodiments.

FIG. 9 is a flow diagram illustrating an example process in which offline sales are supported by the DPS protocol according to some embodiments. In this example, the device 802, having been initially configured at MFR 804, is sitting in a box somewhere. The device is sold using one or more ownership proxies.

In this example, MFR 804 sells the boxed device 802 to retailer RTL 902, then RTL 902 sells it to User 904. In general, there may be multiple parties participating in the ownership chain, such as distributors, shippers, export/import brokers, retailers, etc. As shown, the chain of ownership may be represented by a chained ownership proxy data structure (e.g., data structure 708 depicted in FIG. 7), which is cryptographically traceable to the initial ownership authenticated by the MFR 804.

As illustrated, at 906, RTL 902 supplies its public key to MFR 904 as part of the purchase of the device. In response, MFR 904 creates one or more ownership proxies at 908. The ownership proxy, indicated at 910, may be specific to an individual device, a specified group of devices, or to all devices from MFR 804, for example.

Later, User 904 buys device 802 (optionally, along with other devices) at 912. As part of this transaction, User 904 supplies its public key to RTLR 902 at 914. Using the User's public key, RTLR 902 creates an ownership proxy at 916 to represent the transfer of ownership for this latest transaction. The created ownership proxy, as indicated at 918, includes the ownership proxy 910 from the first transfer of ownership nested in chained fashion along with the User public key, all signed by RTL. Accordingly, ownership proxy 918 represents the chain of ownership of device 802. At 920, User 902 may use ownership proxy 918 to prove its ownership of device 802 and, thereafter, exercise its rights of ownership such as managing the device 802, arranging for a subsequent transfer of ownership, etc.

Figure 10:
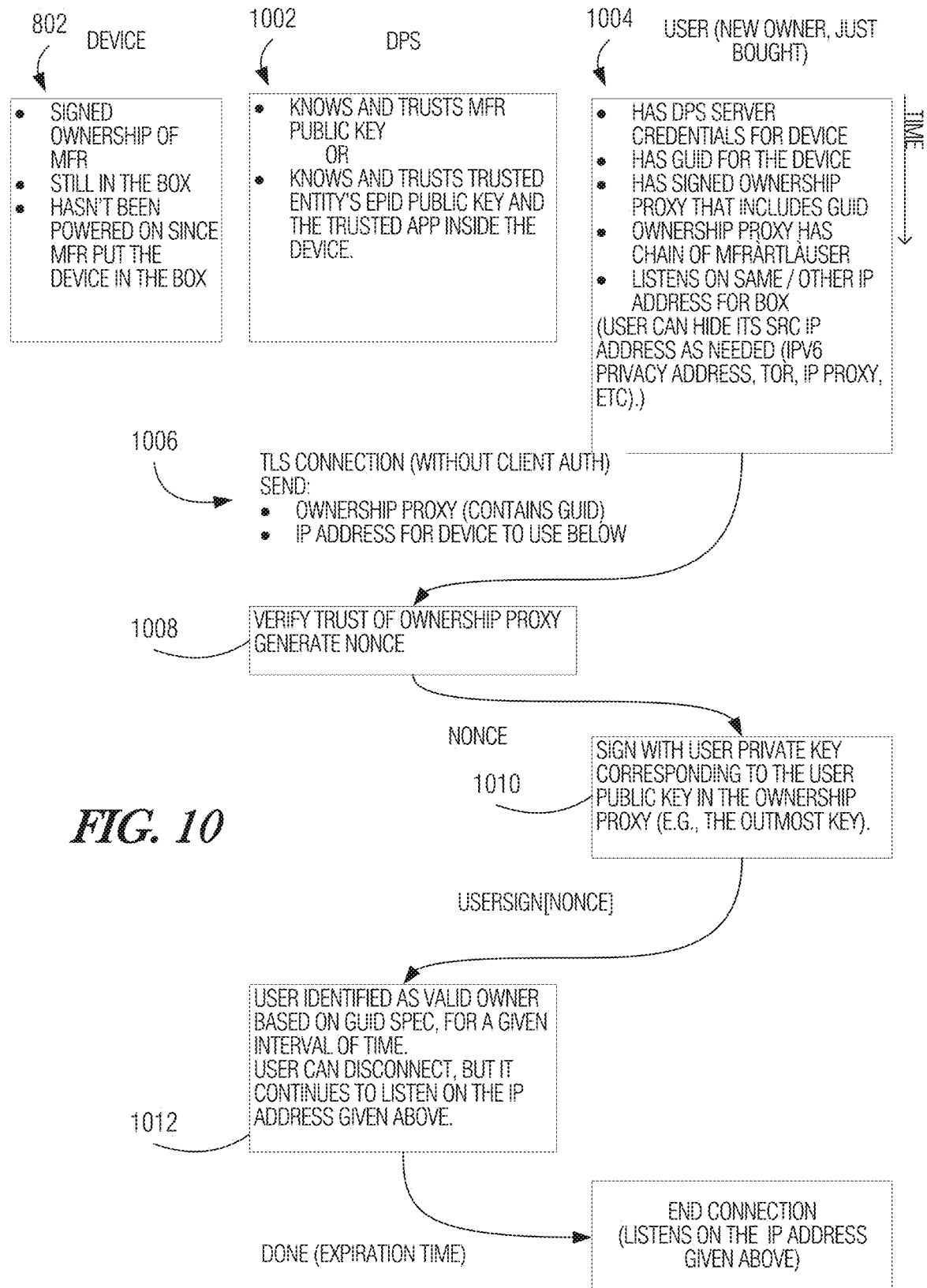
FIG. 10 is a flow diagram illustrating a New Owner Identify (NO) protocol according to some embodiments.

FIG. 10 is a flow diagram illustrating a New Owner Identify (NO) protocol according to some embodiments. Briefly, with reference to FIG. 1, the NO Protocol serves to connect client 132 of the owner 130 with the DPS 120. In this protocol, generally speaking, the client 132 indicates its intention to take control of a specific device 106, based on the Device's current GUID.

As depicted in FIG. 10, User 1004, who is at this point a new owner of the device 802, identifies itself to the DPS 1002 at 1006. User 1004 is authorized to take ownership by virtue of chained ownership proxy 918. The DPS needs to trust one of the entries in the ownership proxy chain. This is achievable since the first entity in the chain is owned by the entity that selected the DPS to be used.

User 1004 connects to DPS 1002 at 1006. This connection may be used exclusively for this purpose according to an example embodiment. In a related embodiment, the user 1004 need not identify itself to DPS server. User 1004 may also take steps to hide its connection from anyone who is monitoring traffic to and from the DPS.

The NO Protocol entails:

Device 802 having undergone the IO protocol and thus has credentials in its TEE identifying the MFR public key that is in the ownership proxy.

The client of User 1004:

has an ownership proxy, whose most recent public key belongs to Owner 1004, and the GUID of the device, which is also authorized by the ownership proxy;

has the private key that is associated with its public key in the ownership proxy; and has an IP address from which to operate. This IP address need bear no relationship to the service addresses that are used by the User. The User 1004 may take steps to hide its address, such as allocating it dynamically (e.g., using DHCP) or using a IPv6 privacy address. The motivation for hiding this IP address in some embodiments is to maintain the privacy of User 1004 from anyone monitoring network traffic in the vicinity of the DPS.

The DPS 1002 has some way to trust at least one key in the ownership proxy. For example, since MFR 804 selected the DPS 1002, DPS 1002 may be aware of MFR's public key used in the ownership proxy.

In one embodiment, an expiration time is established for transfers of ownership. For instance, DPS 1002 may store a record that connects the device GUID to the User 1004 for some defined amount of time. User 1004 may also wait for a connection from the device 802 for this same amount of time.

At 1012, DPS listens for the valid owner to appear. If user 1004, who is the new owner, appears within the above time interval, it is permitted to complete the transfer ownership protocol (TO) discussed in greater detail below. Otherwise, the DPS the relationship between GUID and IP address and User 1004 expires, necessitating the NO Protocol to be performed again.

In the case of device 802 being connected to a cloud service, the User may repeatedly perform the NO protocol until all devices known to it successfully complete the TO protocol. In the case of device 802 being connected using an application program implementation of the client, the User 904 may arrange to turn on the client engine 132 shortly before turning on the device 802, to expedite the protocol.

Note that DPS 1002 is trusted to faithfully remember the GUID-to-device IP relationship. The other checks performed protect the DPS from denial-of-service (DoS) attacks, but are not necessarily relied upon to imply a greater trust in the DPS. In a particular example, DPS 1002 is not trusted to authorize device transfer of ownership. Furthermore, in another example embodiment, DPS 1002 never learns the result of the device transfer of ownership.

Figure 11A:
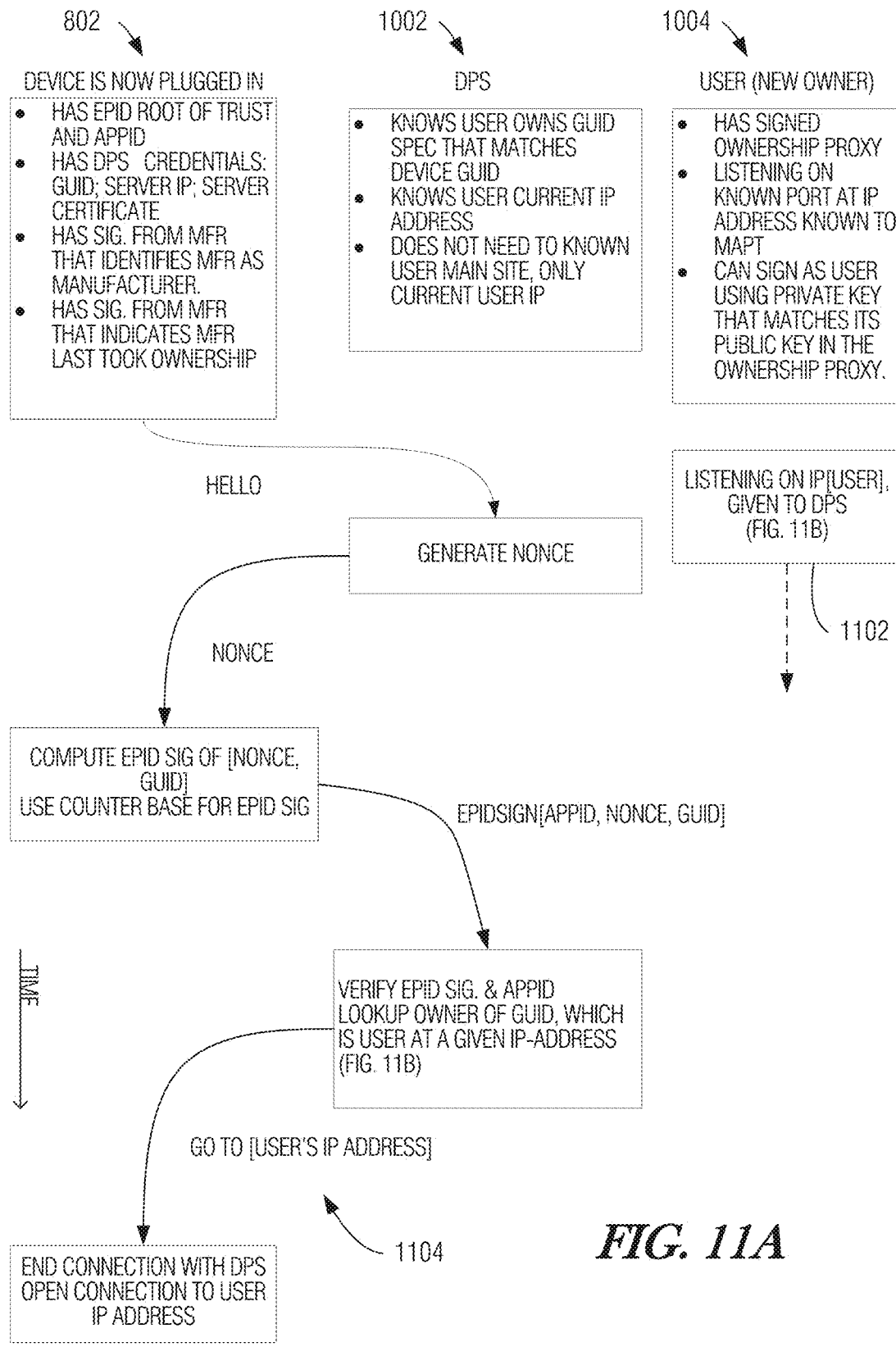
FIGS. 11A and 11B are flow diagrams illustrating a Transfer Ownership (TO) protocol according to some embodiments.
Figure 11B:
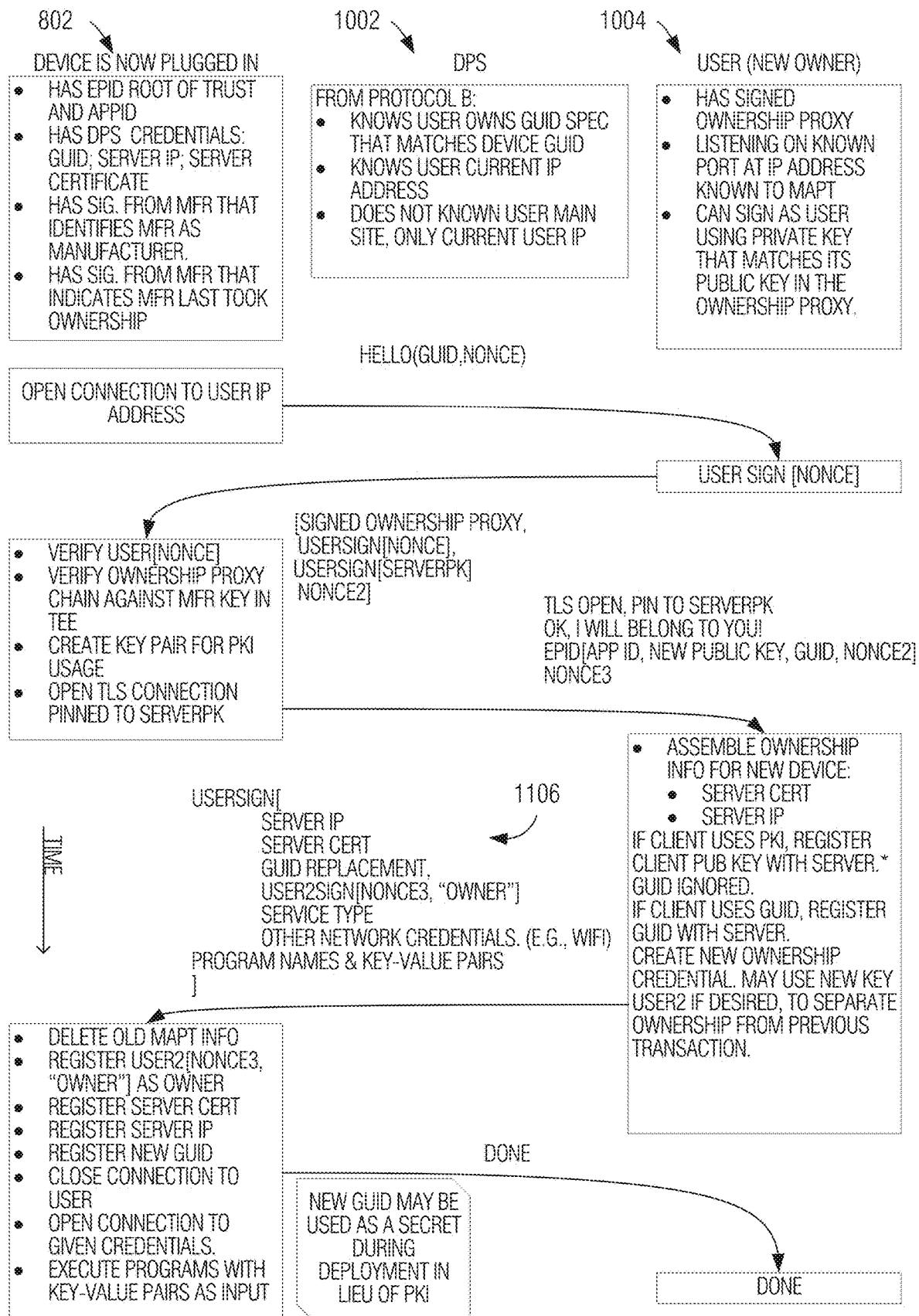

FIGS. 11A and 11B are flow diagrams illustrating a transfer ownership (TO) protocol according to some embodiments. In the example depicted, the TO protocol is to transfer ownership from device's last known owner (in this example, MFR) to the current owner. The (chained) ownership proxy is used at the DPS to "introduce" the device to its new owner. At the end of the protocol the device has credentials to contact User's server, using either PKI or GUID authentication.

The Transfer Ownership Protocol is an interaction between the Device TEE and the DPS Server that points the Device TEE at its intended Owner DPS Client, which has recently completed the New Owner Identify (NO) protocol. In the embodiment depicted in FIGS. 11A and 11B, the TO protocol is shown in two parts: Part 1 as illustrated in FIG. 11A, and Part 2 as illustrated in FIG. 11B.

FIG. 11A represents a first part of the TO protocol, in which the device 802 and the DPS 1002 complete a rendezvous protocol that also comprises the NO protocol (FIG. 10), the result of which is to inform the device 802 about the new owner, which in the present example is shown to be User 1004. In a related embodiment, the rendezvous may be performed using a table lookup, such as a clearinghouse server, a DNS-based Authentication of Named Entities (DANE) or other DNS lookup. Also, the rendezvous may be performed manually (e.g., by a user using a local operator interface of device 802) according to another type of embodiment.

FIG. 11B represents the second part of the TO protocol, in which the device communicates with the new owner to establish the new ownership relationship.

The Transfer Ownership protocol starts with:

Device 802 that has undergone the Initial Ownership Protocol (TO) and thus has credentials (e.g., in its TEE) identifying the MFR public key that is in the ownership proxy.

User 1004 and DPS 1002 that have successfully completed the New Owner Identify (NO) protocol:

The DPS 1002 has a relationship between the GUID stored in the device 802 and an IP address.

The User 1004 is waiting for a connection from the device 802 on this same IP address at 1102.

If these conditions are not met, device 802 will fail to complete the TO protocol. In this case, it may repeatedly try to complete the protocol with an interval of time between tries. The interval of time may be chosen with a random component to try to avoid congestion at DPS 1002.

The TO Protocol includes:

DPS 1002 informs device 802 of the IP address of User 1004, as indicated at 1104.

User 1004 transfers new credentials to the device 802 at 1106. These credentials include enough information for device 802 to invoke the correct manager agent 112 (FIG. 1) and allow it to connect to the owner's manager service 134 (FIG. 1) of User 1004.

Client 132 (FIG. 1) of User 1004 transfers these credentials to the owner's manager service 134, making manager service 134 ready to receive a connection from the device 802.

PI 108 of device 802 receives the credentials, and grants access to the credentials to its manager agent 112, making it ready to connect to the owner's manager service 134.

Figure 12:
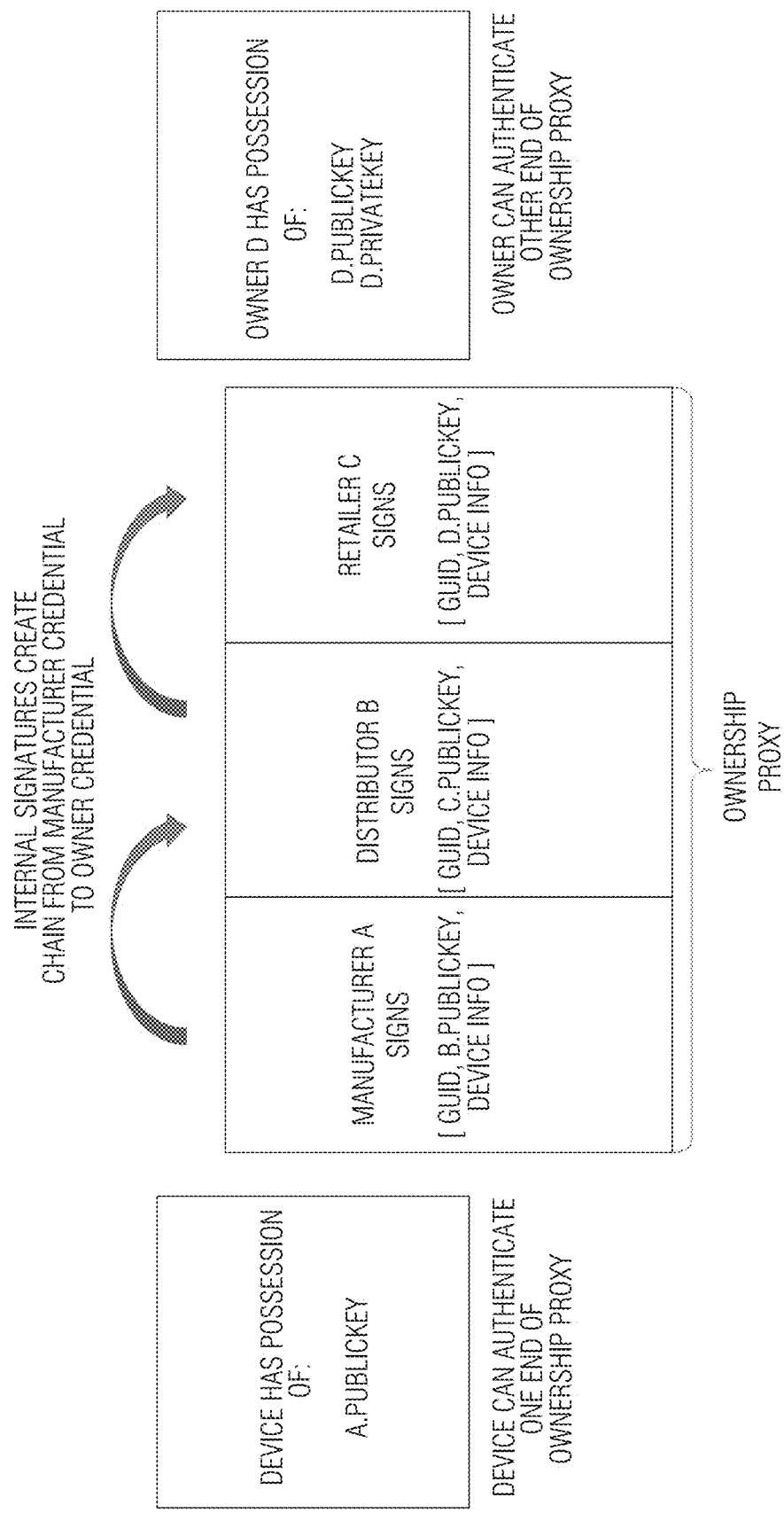
FIG. 12 is a diagram illustrating an ownership proxy according to some embodiments.

FIG. 12 is a diagram illustrating an ownership proxy according to some embodiments. The ownership proxy is a structured digital document that links the Manufacturer with the Owner. It is formed as a chain of signed public keys, each signature of a public key authorizing the possessor of the corresponding private key to take ownership of the Device or pass ownership through another link in the chain.

In the example depicted, an ownership proxy has 3 entries. In the first entry, Manufacturer A, signs the public key of distributor B. In the second entry, Distributor B signs the public key of Retailer C. In the third entry, Retailer C signs the public key of Owner D.

The entries also contain a description of the GUID or GUIDs to which they apply, and a description of the make and model of the device.

The signatures in the ownership proxy create a chain of trust from the manufacturer to the owner. In some embodiments, the Device is pre-provisioned (in the Initial Ownership Protocol) with A.PublicKey. The owner may prove his connection with the ownership proxy (and thus his right to take ownership of the Device) by proving its ownership of D.PrivateKey. It may do this by signing a nonce or other ephemeral object, which signature may be verified using D.PublicKey from the ownership proxy.

In the Transfer Ownership (TO) Protocol of FIG. 11B, User 1004, who is the Owner, proves its ownership of the device 802 using a signature (as above) and an ownership proxy that is rooted in A.PublicKey. The device compares A.PublicKey stored in its TEE with A.PublicKey in the ownership proxy, then verifies the signatures of the ownership proxy in sequence, until it comes to D.PublicKey. The Owner provides the Device separate proof of D.PublicKey, completing the chain of trust. Note that the private keys corresponding to the "interior" sections (in this case, the one section in the middle) of the ownership proxy are never needed to prove ownership.

In some embodiments, the public keys in the ownership proxy are public keys. They may exclude other ownership info, such as the name of the entity that owns the public key, what other keys they may own, where they are, etc. In one example, there are no X.509 Certificates in the ownership proxy.

In an example embodiment, the ownership proxy is maintained only for the purposes of connecting a particular device with its particular first owner. The entities involved may allocate multiple key pairs for different cases of the ownership proxy, to ensure that potential attackers cannot use ownership proxies as a means to map out the flow of devices from factory to implementation. The DPS protocols also help to mask this information, though refreshing public keys is a useful additional step according to some embodiments.

Conversely, if it is desired to have specific knowledge of each of the parties contributing to the ownership proxy, this information may be provided by hosting X.509 certificates with the same public keys as the ownership proxy at a specific (public or private) site known to the transacting parties. In this case, the ownership proxy may be used as a record of the supply chain. Other, external, guarantees may be needed to ensure that the ownership proxy contains all the parties in the supply chain.

Figure 13:
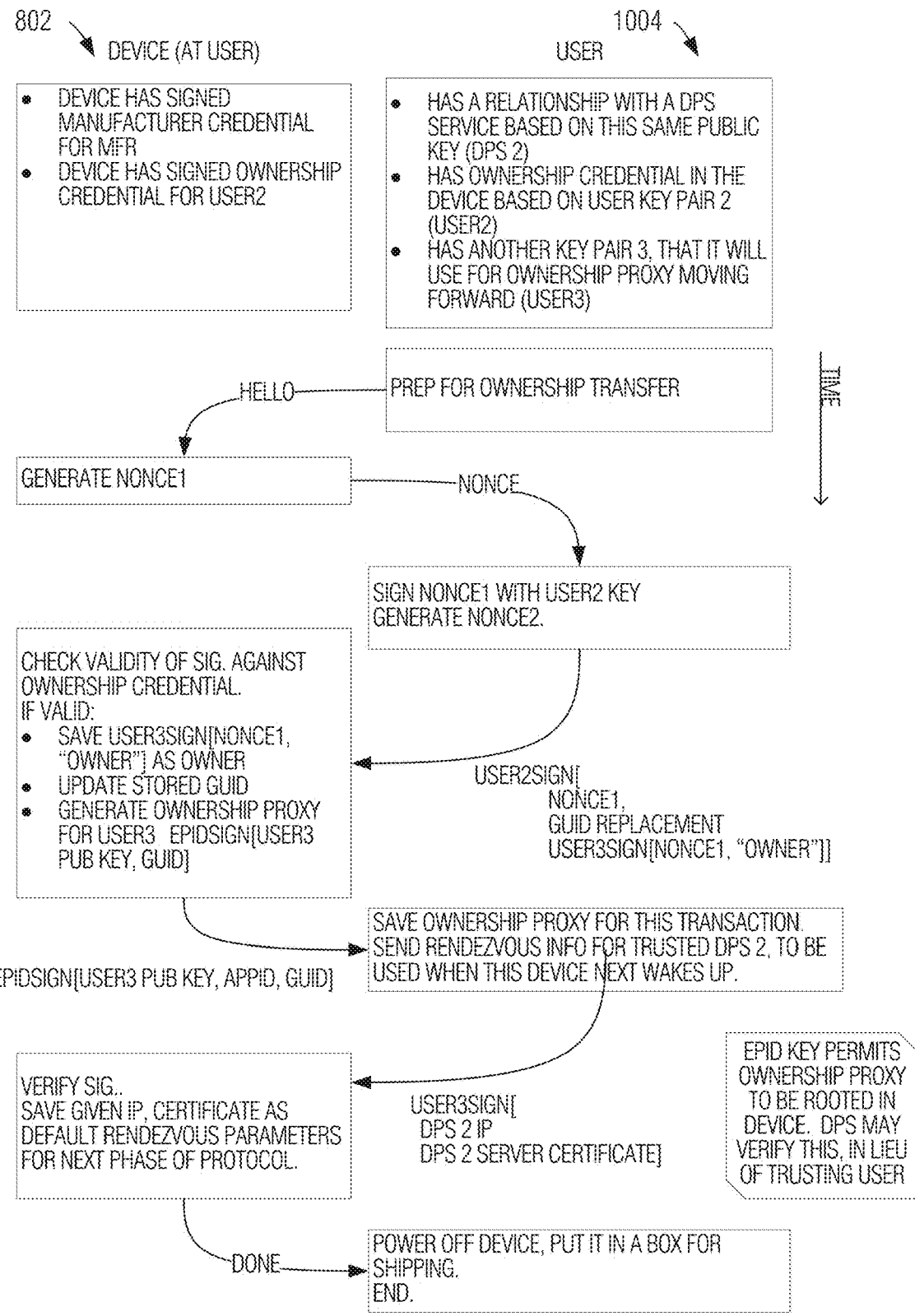
FIG. 13 is a flow diagram illustrating a preparation for resale protocol according to some embodiments.

FIG. 13 is a flow diagram illustrating a preparation for resale protocol according to some embodiments. This protocol is applicable when the User 1004 wishes to transfer ownership (e.g., sell the device 802). At the outset for this protocol, the device 802 is in User's dominion. The preparation for resale protocol supports maintaining the User's privacy by keeping the details of this transfer private from previous owners of the device. Accordingly, the Device may prove that it is manufactured by MFR, but clears all subsequent history of ownership.

Figure 14:
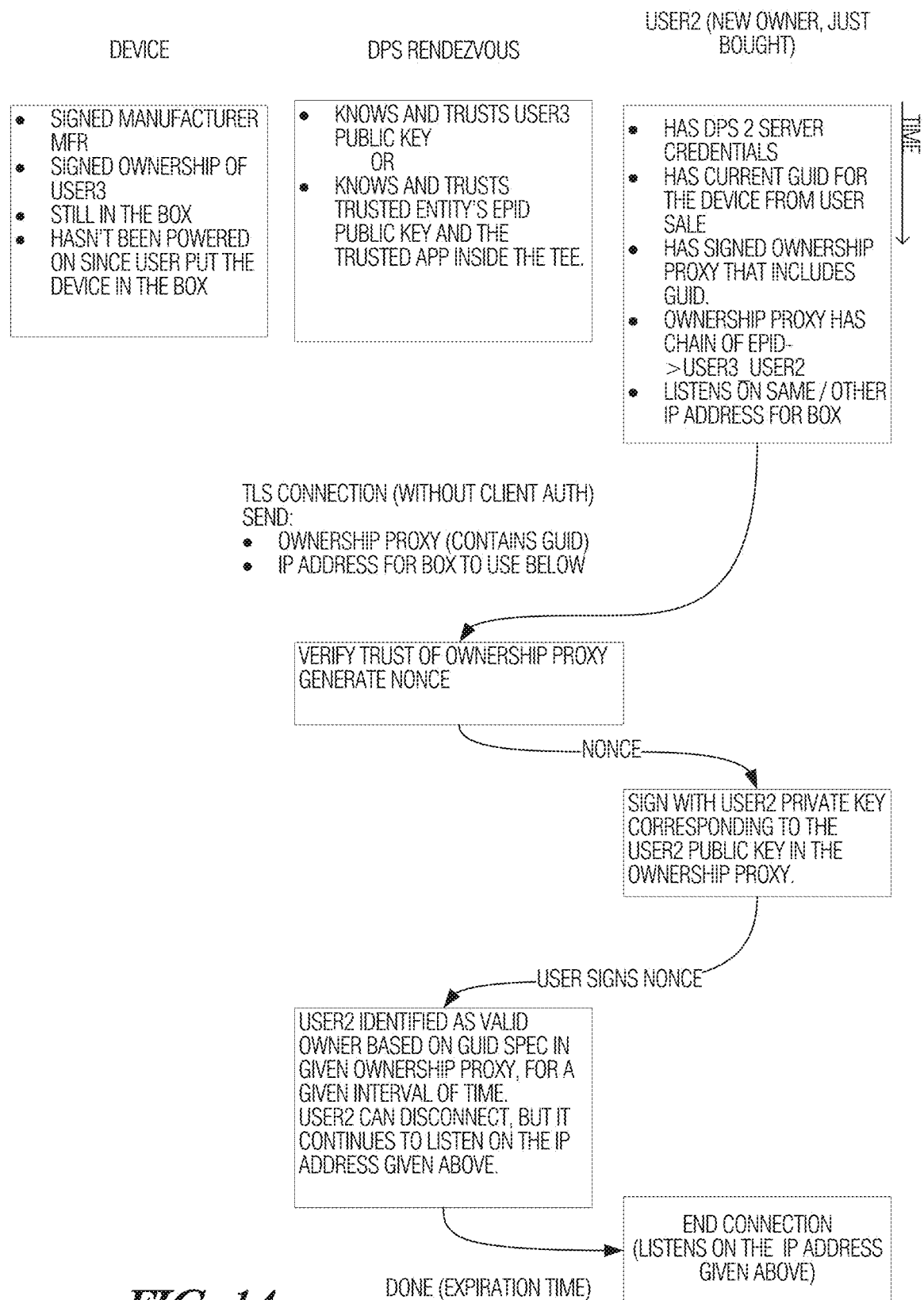
FIG. 14 is a flow diagram depicting a further transfer of ownership from USER to USER2, which may occur in the case of a resale of the Device according to some embodiments.

FIG. 14 is a flow diagram depicting a further transfer of ownership from USER to USER2, which may occur in the case of a resale of the Device according to some embodiments. This protocol is similar to the NO protocol discussed above with reference to FIG. 10, except that the owner is USER and the new owner is USER2.

Figure 15A:
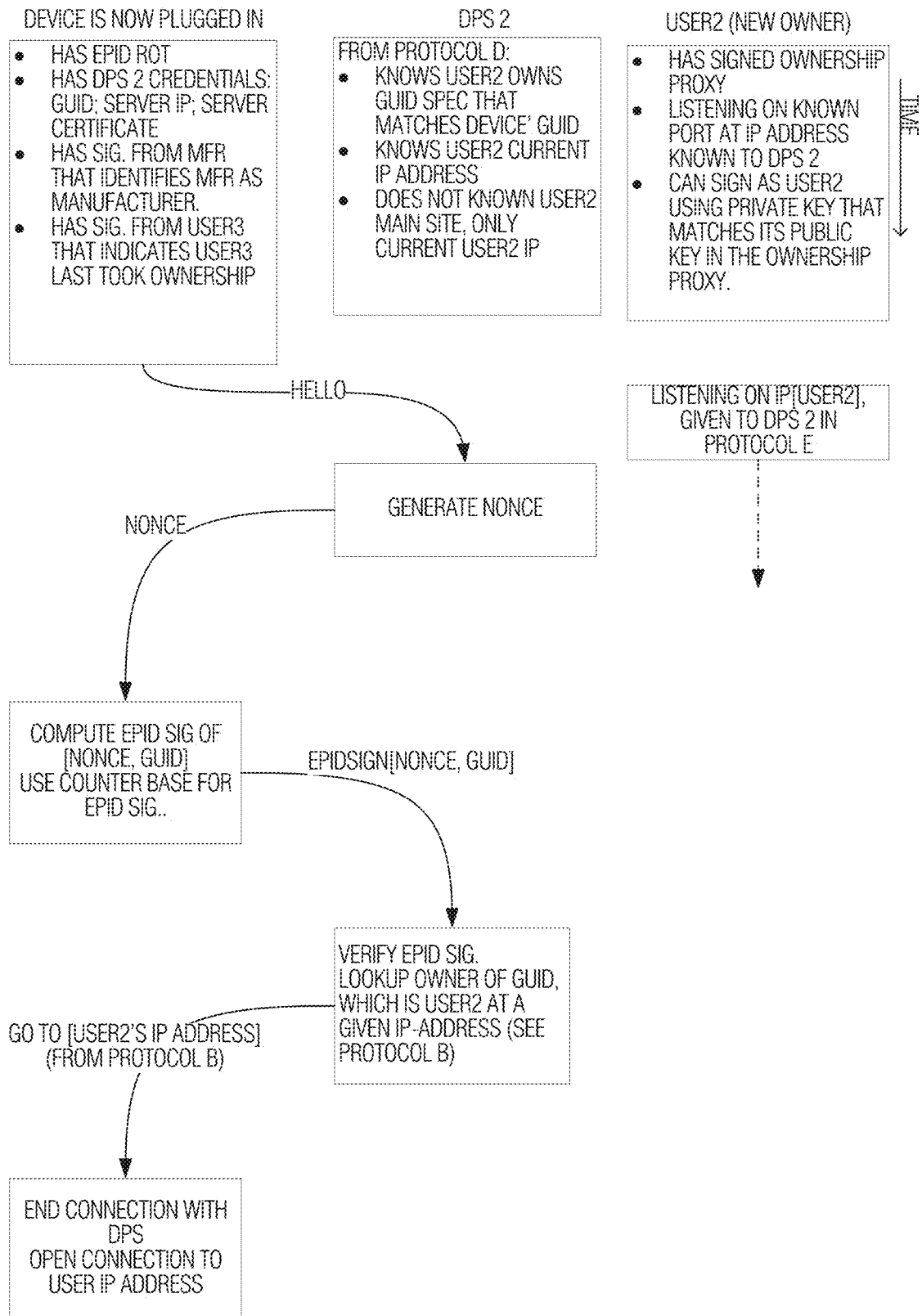
FIGS. 15A and 15B are flow diagrams illustrating the resale protocol according to some embodiments.
Figure 15B:
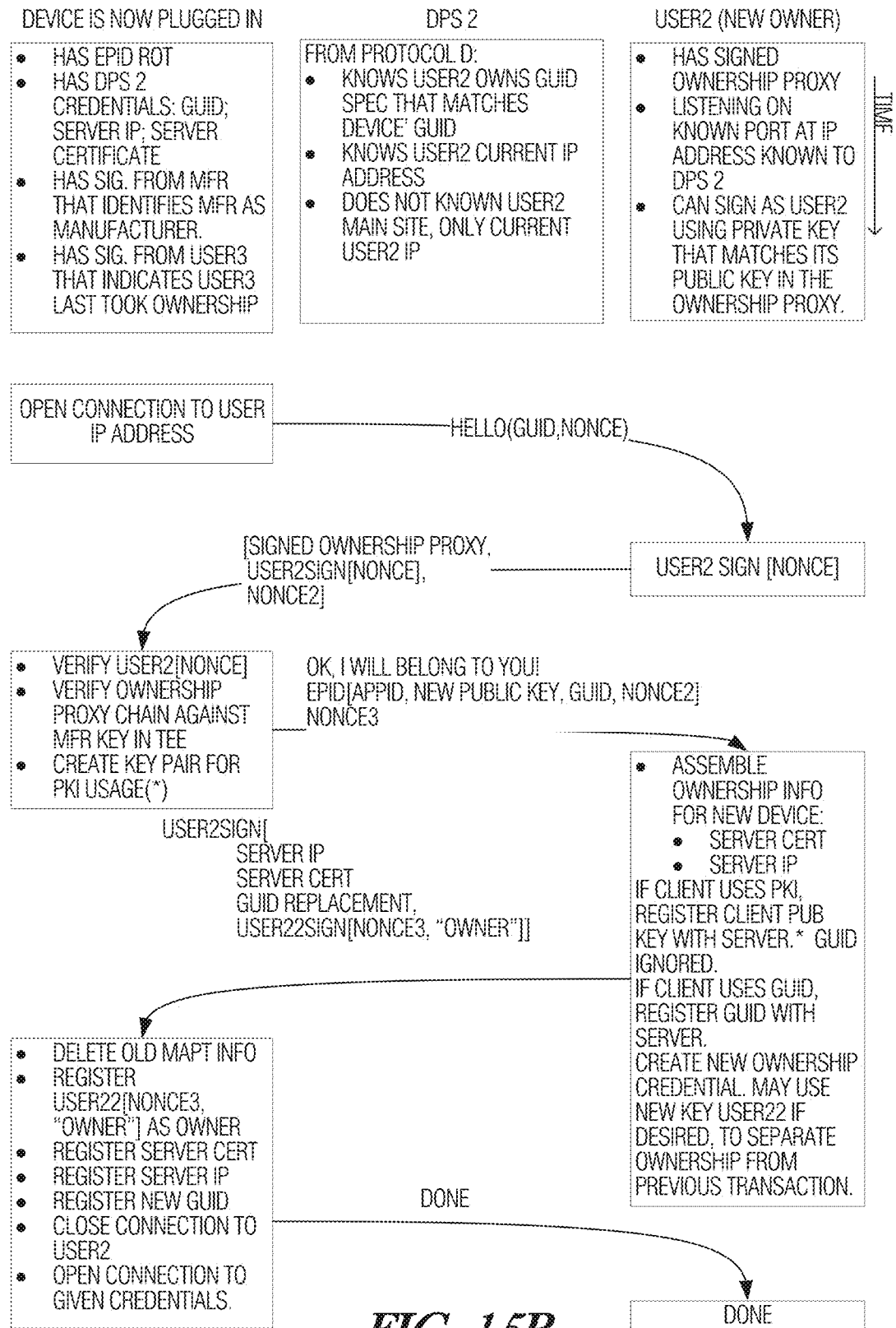

FIGS. 15A-15B are flow diagrams illustrating the resale protocol according to some embodiments. This protocol is similar to the transfer of ownership protocol discussed above with reference to FIG. 11, except that the device now has an EPID root key to mask its previous origins.

Additional Notes and Examples

Example 1 is a computing device provisionable to be remotely managed by a current owner, the device comprising: execution hardware including at least one processor core and a data store; a provisioning interface operative via the execution hardware, wherein the provisioning interface is configured with an initial cryptographic basis of trust, and with an owner identifier that facilitates establishment of communication with the current owner of the device, and wherein the provisioning interface is configured to receive and verify a transfer-of-ownership indication against the initial basis of trust to establish a new current owner; and a manager agent operative via the execution hardware to communicate with a device management service of the new current owner of the device based on the transfer-of-ownership indication.

In Example 2, the subject matter of Example 1 optionally includes wherein the provisioning interface is further configured to rendezvous with a remote device provisioning system (DPS), the DPS maintaining a database that associates the computing device with a current owner of the device, wherein the provisioning interface is to receive the transfer-of-ownership indication from the DPS.

In Example 3, the subject matter of Example 2 optionally includes wherein the provisioning interface is configured with an initial rendezvous address that points to an address of the DPS.

In Example 4, the subject matter of Example 3 optionally includes wherein the provisioning interface is configured to accept an updated rendezvous address that points to an address of a second DPS designated by the current owner.

In Example 5, the subject matter of any one or more of Examples 1-4 optionally include the transfer-of-ownership indication includes an ownership proxy data structure that includes a current ownership indication verifiable using the initial basis of trust.

In Example 6, the subject matter of Example 5 optionally includes wherein the ownership proxy data structure includes a chain of ownership comprising indications of subsequent owners, wherein each indication of subsequent owner is signed by a preceding owner.

In Example 7, the subject matter of any one or more of Examples 1-6 optionally include wherein the initial basis of trust includes a public key of a trusted entity.

In Example 8, the subject matter of any one or more of Examples 1-7 optionally include wherein the initial basis of trust includes a digital signature of an initial owner of the computing device.

In Example 9, the subject matter of any one or more of Examples 1-8 optionally include wherein the provisioning interface includes a trusted execution environment (TEE) that includes a data store inaccessible from outside the TEE.

In Example 10, the subject matter of any one or more of Examples 1-9 optionally include wherein the initial basis of trust utilizes enhanced privacy identification (EPID) keys.

Example 11 is a device provisioning system (DPS) server, comprising: a computing platform including processing hardware; and a DPS engine operative to cause the computing platform to: communicate with a DPS-enabled computing device; maintain a record associating the DPS-enabled computing device with a current owner of the DPS-enabled computing device; in response to a communication from the DPS-enabled computing device, provide the DPS-enabled computing device with information regarding the current owner; communicate with the current owner of the DPS-enabled device to receive an indication of a transfer of ownership to another owner; and in response to the indication of the transfer of ownership, update the record.

In Example 12, the subject matter of Example 11 optionally includes wherein the DPS engine is further configured to cause the computing platform to maintain a record associating the computing device with a cryptographic ownership credential verifiable by the computing device using the initial basis of trust.

In Example 13, the subject matter of Example 12 optionally includes wherein the cryptographic ownership credential is based on a public key of a previous owner of the DPS-enabled computing device.

In Example 14, the subject matter of any one or more of Examples 12-13 optionally include wherein the cryptographic ownership credential is based on a public key of the manufacturer of the DPS-enabled computing device.

In Example 15, the subject matter of any one or more of Examples 12-14 optionally include wherein the cryptographic ownership credential is based on an enhanced privacy identification (EPID) public key.

In Example 16, the subject matter of any one or more of Examples 11-15 optionally include wherein the indication of the transfer of ownership includes an ownership proxy data structure that includes a current ownership indication verifiable by the DPS-enabled device.

Example 17 is a system for remotely managing a computing device, the system comprising: execution hardware including at least one processor core and a data store; a client engine operative via the execution hardware, the client engine being configured to exercise dominion over the computing device in response to a first transfer of ownership, the first transfer of ownership establishing the system as being a new owner of the computing device based on an initial cryptographic basis of trust verifiable by the computing device; and a device management engine to manage a configuration setting of the computing device when the system is designated as a current owner of the computing device.

In Example 18, the subject matter of Example 17 optionally includes wherein the client engine is further configured to communicate with a remote device provisioning system (DPS), the DPS maintaining a database that associates the computing device with a current owner of the computing device, wherein the DPS is operative to inform the computing device regarding the first transfer of ownership.

In Example 19, the subject matter of Example 18 optionally includes wherein the client engine is further configured to configure the computing device with a new rendezvous address that points to an address of a new DPS in response to a second transfer of ownership subsequent to the first transfer of ownership.

In Example 20, the subject matter of any one or more of Examples 17-19 optionally include wherein the first transfer of ownership is represented by an ownership proxy data structure that includes a current ownership indication verifiable using the initial basis of trust.

In Example 21, the subject matter of Example 20 optionally includes wherein the ownership proxy data structure includes a chain of ownership comprising indications of subsequent owners, wherein each indication of subsequent owner is signed by a preceding owner.

In Example 22, the subject matter of any one or more of Examples 17-21 optionally include wherein the initial basis of trust includes a public key of a trusted entity trusted by the computing device.

In Example 23, the subject matter of any one or more of Examples 17-22 optionally include wherein the initial basis of trust includes a digital signature of an initial owner of the computing device.

In Example 24, the subject matter of any one or more of Examples 17-23 optionally include wherein the initial basis of trust utilizes enhanced privacy identification (EPID) keys.

Example 25 is a machine-implemented method for provisioning a computing device to be remotely managed by a current owner, the method comprising: storing, by the computing device, an initial cryptographic basis of trust, and an owner identifier that facilitates establishment of communication with the current owner of the device; receiving, by the computing device, a transfer-of-ownership indication; verifying, by the computing device, the transfer-of-ownership indication against the initial basis of trust to establish a new current owner; and communicating, by the computing device, with a device management service of the new current owner of the device based on the transfer-of-ownership indication.

In Example 26, the subject matter of Example 25 optionally includes rendezvousing, by the computing device, with a remote device provisioning system (DPS), the DPS maintaining a database that associates the computing device with a current owner of the device; and receiving the transfer-of-ownership indication from the DPS.

In Example 27, the subject matter of Example 26 optionally includes accepting, by the computing device, an updated rendezvous address that points to an address of a second DPS designated by the current owner.

In Example 28, the subject matter of any one or more of Examples 25-27 optionally include wherein the transfer-ofownership indication includes an ownership proxy data structure that includes a current ownership indication verifiable using the initial basis of trust.

In Example 29, the subject matter of Example 28 optionally includes wherein the ownership proxy data structure includes a chain of ownership comprising indications of subsequent owners, wherein each indication of subsequent owner is signed by a preceding owner.

In Example 30, the subject matter of any one or more of Examples 25-29 optionally include wherein the initial basis of trust includes a public key of a trusted entity.

In Example 31, the subject matter of any one or more of Examples 25-30 optionally include wherein the initial basis of trust includes a digital signature of an initial owner of the computing device.

In Example 32, the subject matter of any one or more of Examples 25-31 optionally include wherein the initial basis of trust utilizes enhanced privacy identification (END) keys.

Example 33 is at least one machine-readable medium comprising instructions that, when executed by a computing platform, cause the computing platform to execute the method according to any one of Examples 25-32.

Example 34 is a system comprising means for executing the method according to any one of Examples 25-32.

Example 35 is a method for operating a device provisioning system (DPS) server, the method comprising: communicating with a DPS-enabled computing device; maintaining a record associating the DPS-enabled computing device with a current owner of the DPS-enabled computing device; in response to a communication from the DPS-enabled computing device, providing the DPS-enabled computing device with information regarding the current owner; communicating with the current owner of the DPS-enabled device to receive an indication of a transfer of ownership to another owner; and in response to the indication of the transfer of ownership, updating the record.

In Example 36, the subject matter of Example 35 optionally includes maintaining a record associating the DPS-enabled computing device with a cryptographic ownership credential verifiable by the DPS-enabled computing device.

In Example 37, the subject matter of Example 36 optionally includes wherein the cryptographic ownership credential is based on a public key of a previous owner of the DPS-enabled computing device.

In Example 38, the subject matter of any one or more of Examples 36-37 optionally include wherein the cryptographic ownership credential is based on a public key of the manufacturer of the DPS-enabled computing device.

In Example 39, the subject matter of any one or more of Examples 36-38 optionally include wherein the cryptographic ownership credential is based on an enhanced privacy identification (EPID) public key.

In Example 40, the subject matter of any one or more of Examples 35-39 optionally include wherein the indication of the transfer of ownership includes an ownership proxy data structure that includes a current ownership indication verifiable by the DPS-enabled device.

Example 41 is at least one machine-readable medium comprising instructions that, when executed by a computing platform, cause the computing platform to execute the method according to any one of Examples 35-40.

Example 42 is a system comprising means for executing the method according to any one of Examples 35-40.

Example 43 is a method for remotely managing a computing device, the method comprising: exercising dominion over the computing device in response to a first transfer of ownership, the first transfer of ownership establishing ownership of the computing device and being represented by an ownership proxy data structure that includes a current ownership indication based on an initial cryptographic basis of trust verifiable by the computing device; and managing a configuration setting of the computing device.

In Example 44, the subject matter of Example 43 optionally includes communicating with a remote device provisioning system (DPS), the DPS maintaining a database that associates the computing device with a current owner of the computing device, wherein the DPS is operative to inform the computing device regarding the first transfer of ownership.

In Example 45, the subject matter of Example 44 optionally includes configuring the computing device with a new rendezvous address that points to an address of a new DPS in response to a second transfer of ownership subsequent to the first transfer of ownership.

In Example 46, the subject matter of any one or more of Examples 43-45 optionally include wherein the ownership proxy data structure includes a chain of ownership comprising indications of subsequent owners, wherein each indication of subsequent owner is signed by a preceding owner.

In Example 47, the subject matter of any one or more of Examples 43-46 optionally include wherein the initial basis of trust includes a public key of a trusted entity trusted by the computing device.

In Example 48, the subject matter of any one or more of Examples 43-47 optionally include wherein the initial basis of trust includes a digital signature of an initial owner of the computing device.

In Example 49, the subject matter of any one or more of Examples 43-48 optionally include wherein the initial basis of trust utilizes enhanced privacy identification (EPID) keys.

Example 50 is at least one machine-readable medium comprising instructions that, when executed by a computing platform, cause the computing platform to execute the method according to any one of Examples 43-49.

Example 51 is a system comprising means for executing the method according to any one of Examples 43-49.

Example 52 is a system for provisioning a computing device to be remotely managed by a current owner, the system comprising: means for storing an initial cryptographic basis of trust, and an owner identifier that facilitates establishment of communication with the current owner of the device; means for receiving a transfer-of-ownership indication; means for verifying the transfer-of-ownership indication against the initial basis of trust to establish a new current owner; and means for communicating with a device management service of the new current owner of the device based on the transfer-of-ownership indication.

In Example 53, the subject matter of Example 52 optionally includes means for rendezvousing with a remote device provisioning system (DPS), the DPS maintaining a database that associates the computing device with a current owner of the device; and means for receiving the transfer-of-ownership indication from the DPS.

In Example 54, the subject matter of Example 53 optionally includes means for accepting an updated rendezvous address that points to an address of a second DPS designated by the current owner.

In Example 55, the subject matter of any one or more of Examples 52-54 optionally include wherein the transfer-of-ownership indication includes an ownership proxy data structure that includes a current ownership indication verifiable using the initial basis of trust.

In Example 56, the subject matter of Example 55 optionally includes wherein the ownership proxy data structure includes a chain of ownership comprising indications of subsequent owners, wherein each indication of subsequent owner is signed by a preceding owner.

In Example 57, the subject matter of any one or more of Examples 52-56 optionally include wherein the initial basis of trust includes a public key of a trusted entity.

In Example 58, the subject matter of any one or more of Examples 52-57 optionally include wherein the initial basis of trust includes a digital signature of an initial owner of the computing device.

In Example 59, the subject matter of any one or more of Examples 52-58 optionally include wherein the initial basis of trust utilizes enhanced privacy identification (EPID) keys.

Example 60 is a system for operating a device provisioning system (DPS) server, the system comprising: means for communicating with a DPS-enabled computing device; means for maintaining a record associating the DPS-enabled computing device with a current owner of the DPS-enabled computing device; means for providing the DPS-enabled computing device with information regarding the current owner in response to a communication from the DPS-enabled computing device; means for communicating with the current owner of the DPS-enabled device to receive an indication of a transfer of ownership to another owner; and means for updating the record in response to the indication of the transfer of ownership.

In Example 61, the subject matter of Example 60 optionally includes means for maintaining a record associating the DPS-enabled computing device with a cryptographic ownership credential verifiable by the DPS-enabled computing device.

In Example 62, the subject matter of Example 61 optionally includes wherein the cryptographic ownership credential is based on a public key of a previous owner of the DPS-enabled computing device.

In Example 63, the subject matter of any one or more of Examples 61-62 optionally include wherein the cryptographic ownership credential is based on a public key of the manufacturer of the DPS-enabled computing device.

In Example 64, the subject matter of any one or more of Examples 61-63 optionally include wherein the cryptographic ownership credential is based on an enhanced privacy identification (EPID) public key.

In Example 65, the subject matter of any one or more of Examples 60-64 optionally include wherein the indication of the transfer of ownership includes an ownership proxy data structure that includes a current ownership indication verifiable by the DPS-enabled device.

Example 66 is a system for remotely managing a computing device, the system comprising: means for exercising dominion over the computing device in response to a first transfer of ownership, the first transfer of ownership establishing ownership of the computing device and being represented by an ownership proxy data structure that includes a current ownership indication based on an initial cryptographic basis of trust verifiable by the computing device; and means for managing a configuration setting of the computing device.

In Example 67, the subject matter of Example 66 optionally includes means for communicating with a remote device provisioning system (DPS), the DPS maintaining a database that associates the computing device with a current owner of the computing device, wherein the DPS is operative to inform the computing device regarding the first transfer of ownership.

In Example 68, the subject matter of Example 67 optionally includes means for configuring the computing device with a new rendezvous address that points to an address of a new DPS in response to a second transfer of ownership subsequent to the first transfer of ownership.

In Example 69, the subject matter of any one or more of Examples 66-68 optionally include wherein the ownership proxy data structure includes a chain of ownership comprising indications of subsequent owners, wherein each indication of subsequent owner is signed by a preceding owner.

In Example 70, the subject matter of any one or more of Examples 66-69 optionally include wherein the initial basis of trust includes a public key of a trusted entity trusted by the computing device.

In Example 71, the subject matter of any one or more of Examples 66-70 optionally include wherein the initial basis of trust includes a digital signature of an initial owner of the computing device.

In Example 72, the subject matter of any one or more of Examples 66-71 optionally include wherein the initial basis of trust utilizes enhanced privacy identification (EPID) keys.

Example 73 is at least one machine-readable medium comprising instructions for provisioning a computing device to be remotely managed by a current owner, wherein the instructions, when executed on a machine, cause the machine to perform: storing an initial cryptographic basis of trust, and an owner identifier that facilitates establishment of communication with the current owner of the device; receiving a transfer-of-ownership indication; verifying the transfer-of-ownership indication against the initial basis of trust to establish a new current owner; and communicating with a device management service of the new current owner of the device based on the transfer-of-ownership indication.

In Example 74, the subject matter of Example 73 optionally includes wherein the instructions further cause the machine to perform: rendezvousing with a remote device provisioning system (DPS), the DPS maintaining a database that associates the computing device with a current owner of the device; and receiving the transfer-of-ownership indication from the DPS.

In Example 75, the subject matter of Example 74 optionally includes wherein the instructions further cause the machine to perform: accepting an updated rendezvous address that points to an address of a second DPS designated by the current owner.

In Example 76, the subject matter of any one or more of Examples 73-75 optionally include wherein the transfer-of-ownership indication includes an ownership proxy data structure that includes a current ownership indication verifiable using the initial basis of trust.

In Example 77, the subject matter of Example 76 optionally includes wherein the ownership proxy data structure includes a chain of ownership comprising indications of subsequent owners, wherein each indication of subsequent owner is signed by a preceding owner.

In Example 78, the subject matter of any one or more of Examples 73-77 optionally include wherein the initial basis of trust includes a public key of a trusted entity.

In Example 79, the subject matter of any one or more of Examples 73-78 optionally include wherein the initial basis of trust includes a digital signature of an initial owner of the computing device.

In Example 80, the subject matter of any one or more of Examples 73-79 optionally include wherein the initial basis of trust utilizes enhanced privacy identification (EPID) keys.

Example 81 is at least one machine-readable medium comprising instructions that, when executed on a device provisioning system (DPS) server, cause the DPS server to perform: communicating with a DPS-enabled computing device; maintaining a record associating the DPS-enabled computing device with a current owner of the DPS-enabled computing device; providing the DPS-enabled computing device with information regarding the current owner in response to a communication from the DPS-enabled computing device; communicating with the current owner of the DPS-enabled device to receive an indication of a transfer of ownership to another owner; and updating the record in response to the indication of the transfer of ownership.

In Example 82, the subject matter of Example 81 optionally includes instructions for: maintaining a record associating the DPS-enabled computing device with a cryptographic ownership credential verifiable by the DPS-enabled computing device.

In Example 83, the subject matter of Example 82 optionally includes wherein the cryptographic ownership credential is based on a public key of a previous owner of the DPS-enabled computing device.

In Example 84, the subject matter of any one or more of Examples 82-83 optionally include wherein the cryptographic ownership credential is based on a public key of the manufacturer of the DPS-enabled computing device.

In Example 85, the subject matter of any one or more of Examples 82-84 optionally include wherein the cryptographic ownership credential is based on an enhanced privacy identification (EPID) public key.

In Example 86, the subject matter of any one or more of Examples 81-85 optionally include wherein the indication of the transfer of ownership includes an ownership proxy data structure that includes a current ownership indication verifiable by the DPS-enabled device.

Example 87 is at least one machine-readable medium comprising instructions for remotely managing a computing device, wherein the instructions, when executed on a machine, cause the machine to perform: exercising dominion over the computing device in response to a first transfer of ownership, the first transfer of ownership establishing ownership of the computing device and being represented by an ownership proxy data structure that includes a current ownership indication based on an initial cryptographic basis of trust verifiable by the computing device; and managing a configuration setting of the computing device.

In Example 88, the subject matter of Example 87 optionally includes instructions for: communicating with a remote device provisioning system (DPS), the DPS maintaining a database that associates the computing device with a current owner of the computing device, wherein the DPS is operative to inform the computing device regarding the first transfer of ownership.

In Example 89, the subject matter of Example 88 optionally includes instructions for: configuring the computing device with a new rendezvous address that points to an address of a new DPS in response to a second transfer of ownership subsequent to the first transfer of ownership.

In Example 90, the subject matter of any one or more of Examples 87-89 optionally include wherein the ownership proxy data structure includes a chain of ownership comprising indications of subsequent owners, wherein each indication of subsequent owner is signed by a preceding owner.

In Example 91, the subject matter of any one or more of Examples 87-90 optionally include wherein the initial basis of trust includes a public key of a trusted entity trusted by the computing device.

In Example 92, the subject matter of any one or more of Examples 87-91 optionally include wherein the initial basis of trust includes a digital signature of an initial owner of the computing device.

In Example 93, the subject matter of any one or more of Examples 87-92 optionally include wherein the initial basis of trust utilizes enhanced privacy identification (EPID) keys.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed. Description, with a claim standing on its own as a separate embodiment. The scope of the embodiments disclosed herein is to be determined with reference to the appended claims, along with the full scope of equivalents to which such claims are entitled.

What is claimed is:

1. A computing device provisionable to be remotely managed by a current owner, the device comprising:
    execution hardware including at least one processor core and a data store;

a provisioning interface operative via the execution hardware, wherein the provisioning interface is configured with an initial cryptographic basis of trust, and with an owner identifier that facilitates establishment of communication with the current owner of the device, and wherein the provisioning interface is configured to receive and verify a transfer-of-ownership indication against the initial basis of trust to establish a new current owner, wherein the transfer-of-ownership indication includes an ownership proxy data structure, wherein the ownership proxy data structure includes a chain of ownership comprising public keys of a first owner and any subsequent owners, wherein each public key of a subsequent owner is signed by a preceding owner, and the public key of the first owner is signed by the initial basis of trust, and wherein a current ownership public key is verifiable using the initial basis of trust, and wherein the public key of the first owner is signed by every subsequent owner; and a manager agent operative via the execution hardware to communicate with a device management service of the new current owner of the device based on the transfer-of-ownership indication.

2. The computing device of claim 1, wherein the provisioning interface is further configured to rendezvous with a remote device provisioning system (DPS), the DPS maintaining a database that associates the computing device with a current owner of the device, wherein the provisioning interface is to receive the transfer-of-ownership indication from the DPS.

3. The computing device of claim 2, wherein the provisioning interface is configured with an initial rendezvous address that points to an address of the DPS.

4. The computing device of claim 3, wherein the provisioning interface is configured to accept an updated rendezvous address that points to an address of a second DPS designated by the current owner.

5. The computing device of claim 1, wherein the initial basis of trust includes a public key of a trusted entity.

6. The computing device of claim 1, wherein the initial basis of trust includes a digital signature of an initial owner of the computing device.

7. The computing device of claim 1, wherein the provisioning interface includes a trusted execution environment (TEE) that includes a data store inaccessible from outside the TEE.

8. The computing device of claim 1, wherein the initial basis of trust utilizes enhanced privacy identification (EPID) keys.

9. A system for remotely managing a computing device, the system comprising:
   execution hardware including at least one processor core and a data store;
   a client engine operative via the execution hardware, the client engine being configured to exercise dominion over the computing device in response to a first transfer of ownership, the first transfer of ownership establishing the system as being a new owner of the computing device based on an initial cryptographic basis of trust verifiable by the computing device, wherein the first transfer-of-ownership indication includes an ownership proxy data structure, wherein the ownership proxy data structure includes a chain of ownership comprising public keys of a first owner and any subsequent owners, wherein each public key of a subsequent owner is signed by a preceding owner, and the public key of the first owner is signed by the initial basis of trust, and wherein a current ownership public key is verifiable using the initial cryptographic basis of trust, and wherein the public key of the first owner is signed by every subsequent owner; and a device management engine to manage a configuration setting of the computing device when the system is designated as a current owner of the computing device.

10. The system of claim 9, wherein the client engine is further configured to communicate with a remote device provisioning system (DPS), the DPS maintaining a database that associates the computing device with a current owner of the computing device, wherein the DPS is operative to inform the computing device regarding the first transfer of ownership.

11. The system of claim 10, wherein the client engine is further configured to configure the computing device with a new rendezvous address that points to an address of a new DPS in response to a second transfer of ownership subsequent to the first transfer of ownership.

12. The system of claim 9, wherein the initial basis of trust includes a public key of a trusted entity trusted by the computing device.

13. The system of claim 9, wherein the initial basis of trust includes a digital signature of an initial owner of the computing device.

14. The system of claim 9, wherein the initial basis of trust utilizes enhanced privacy identification (EPID) keys.

15. At least one non-transitory machine-readable medium comprising instructions for provisioning a computing device to be remotely managed by a current owner, wherein the instructions, when executed on a machine, cause the machine to perform:
   storing an initial cryptographic basis of trust, and an owner identifier that facilitates establishment of communication with the current owner of the device;
   receiving a transfer-of-ownership indication;
   verifying the transfer-of-ownership indication against the initial basis of trust to establish a new current owner, wherein the transfer-of-ownership indication includes an ownership proxy data structure, wherein the ownership proxy data structure includes a chain of ownership comprising public keys of a first owner and any subsequent owners, wherein each public key of a subsequent owner is signed by a preceding owner, and the public key of the first owner is signed by the initial basis of trust, and wherein a current ownership public key is verifiable using the initial basis of trust, and wherein the public key of the first owner is signed by every subsequent owner; and
   communicating with a device management service of the new current owner of the device based on the transfer-of-ownership indication.

16. The at least one non-transitory machine-readable medium of claim 15, wherein the instructions further cause the machine to perform:
   rendezvousing with a remote device provisioning system (DPS), the DPS maintaining a database that associates the computing device with a current owner of the device; and
   receiving the transfer-of-ownership indication from the DPS.

17. The at least one non-transitory machine-readable medium of claim 16, wherein the instructions further cause the machine to perform:
   accepting an updated rendezvous address that points to an address of a second DPS designated by the current owner.

18. The at least one non-transitory machine-readable medium of claim 15, wherein the initial basis of trust includes a public key of a trusted entity.

19. The at least one non-transitory machine-readable medium of claim 15, wherein the initial basis of trust includes a digital signature of an initial owner of the computing device.

\* \* \* \* \*